United States Patent
Richardson et al.

(10) Patent No.: US 6,628,864 B2
(45) Date of Patent: Sep. 30, 2003

(54) OPTICAL CODE GENERATION AND DETECTION

(75) Inventors: David John Richardson, Southampton (GB); Periklis Petropoulis, Patras (GR); Morten Ibsen, Southampton (GB); Peh Chiong Teh, Perak (MY)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 09/803,367

(22) Filed: Mar. 8, 2001

(65) Prior Publication Data

US 2002/0150334 A1 Oct. 17, 2002

(30) Foreign Application Priority Data

Mar. 9, 2000 (GB) ................................. 0005615

(51) Int. Cl.[7] .............................. G02B 6/34; H04J 14/08
(52) U.S. Cl. ................................. 385/37; 385/24; 385/1; 385/2; 385/3; 385/31; 359/130; 359/183; 359/184; 359/185
(58) Field of Search ............................. 385/24, 1, 2, 3, 385/37, 31, 38; 359/130, 183, 136, 185, 121, 125, 181, 184, 189; 347/137

(56) References Cited

U.S. PATENT DOCUMENTS

| 4,413,353 A | * 11/1983 | Macovski et al. ............. 378/62 |
| 5,288,995 A | * 2/1994 | Strachan ................. 250/227.12 |
| 5,760,941 A | * 6/1998 | Young et al. ................. 359/181 |
| 5,963,586 A | 10/1999 | Durrant et al. ............. 375/208 |
| 6,094,307 A | * 7/2000 | Ieki ............................. 359/569 |
| 6,313,771 B1 | * 11/2001 | Munroe et al. ............. 341/137 |

FOREIGN PATENT DOCUMENTS

| EP | 0 897 124 | 2/1999 | ............... 385/37 X |
| WO | 98/08120 | 2/1998 | ............... 385/37 X |
| WO | 99/22255 | 5/1999 | ............... 385/37 X |
| WO | 99/67668 | 12/1999 | ............... 385/37 X |
| WO | 00/10038 | 2/2000 | ............... 385/37 X |

OTHER PUBLICATIONS

N. Wada et al., "A 10Gb/s Optical Code Division Multiplexing Using 8–Chip Optical Bipolar Code and Coherent Detection", Journal of Lightwave TechnologY, vol. 17, No. 10, pp. 1758–1765, Oct. 1999.

H. Tsuda et al., "Spectral encoding and decoding of 10 Gbit/s femtosecond pulses using high resolution arrayed–waveguide grating", Electronics Letters, vol. 35, No. 14, pp. 1186–1187, Jul. 8, 1999.

Michel E. Marhic, "Coherent Optical CDMA Networks", Journal of Lightwave Technology, vol. 11, No. 5/6, pp. 854–863, May/Jun. 1993.

(List continued on next page.)

Primary Examiner—Brian Healy
(74) Attorney, Agent, or Firm—Renner, Otto, Boisselle & Sklar, LLP

(57) ABSTRACT

Optical code division multiple access (OCDMA) coder:decoder gratings have been fabricated. The modulated refractive index profile that makes up the OCDMA coder:decoder grating incorporates changes in polarity between OCDMA chips by discrete phase shifts, thereby to provide bipolar coding through phase modulation. (In another embodiment quadrupolar coding is achieved). For NRZ modulation, each grating section is either in phase with, or has a predetermined phase shift relative to, the preceding grating section, depending on whether the OCDMA signature has a change in polarity between chips. RZ modulation is also possible. Results are presented from specific examples of bipolar OCDMA with NRZ modulation, which show higher data rates (10 Gbit/s), shorter chip-lengths (6.4 ps) and far longer code sequences (63 bits) than previously demonstrated. Other embodiments relate to optical packet switching, for example using the Internet Protocol (IP) or Asynchronous Transfer Mode (ATM).

21 Claims, 23 Drawing Sheets

OTHER PUBLICATIONS

P.R. Pructnal et al., "Spread Spectrum Fiber–Optic Local Area Network Using Optical Processing", Journal of Lightwave Technology, vol. 4, No. 5, pp. 547–554, May 1986.

R.M. Gagliardi et al., "Fiber–Optic Digital Video Multiplexing Using Optical CDMA", Journal of Lightwave Technology, vol. 11, No. 1, pp. 20–26, Jan. 1993.

H.P. Sardesai et al., "A Femtosecond Code–Division Multiple–Access Communication System test Bed", Journal of Lightwave Technology, vol. 16, No. 11, pp. 1953–1964, Nov. 1998.

Tasshi Dennis et al., "Optical Implementation of Bipolar Codes", IEEE Journal of Quantum Electronics, vol. 35, No. 3, pp. 287–291, Mar. 1999.

Habib Fathallah et al., "Passive Optical Fast Frequency–Hop CDMA Communications System", Journal of Lightwave Technology, vol. 17, No. 3, pp. 397–405, Mar. 1999.

N. Wada et al., "2.5 Gbit/s time–spread/wavelength–hop optical code division multiplexing using fibre Bragg grating with supercontinuum light source", Electronics Letters, vol. 36, No. 9, pp. 815–817, Apr. 27, 2000.

A. Grunnet–Jepsen et al., "Demonstration of All–Fiber Sparse Lightwave CDMA Based on Temporal Phase Encoding", IEEE Photonics Technology Letters, vol. 11, No. 10, pp. 1283–1285, Oct. 1999.

H. Geiger et al., "Demonstration of a Simple CDMA Transmitter and Receiver Using Sampled Fibre Gratings", Technical Proceeding ECOC '98, vol. 1, pp. 337–338, Sep. 20–24, 1998.

A.J. Viterbi, "CDMA Principles of Spread Spectrum Communication", Addision–Wesley, pp 4–8, 1995.

Morten Ibsen et al., "Recent advances in long dispersion compensating fibre Bragg gratings", IEE Publications, UK ISSN 0963–3308–ref.No. 1999/023, 1999.

B.J. Eggleton et al., "Long periodic superstructure Bragg gratings in optical fibres", Electronics Letters, vol. 30, No. 19, pp. 1620–1622, Sep. 15, 1994.

R. Gold, "Optical Binary Sequences for Spread Spectrum Multiplexing", IEEE Transaction on Information Theory, vol. IT–B, pp. 619–621, Oct. 1967.

E.H. Dinan et al., "Spreading Codes for Direct Sequence CDMA and Wideband CDMA Cellular Networks", IEEE Communications Magazine, vol. 36, pp. 48–54, Sep. 1998.

Morten Ibsen et al., "Sinc–Sampled Fiber Bragg Gratings for Identical Multiple Wavelength Operation", IEEE Photonics Technology Letters, vol. 10, No. 6, pp. 842–844, Jun. 1998.

* cited by examiner

M7U-1

M7B-1

M7U-1*

G63B-1:G63B-1* (———)
G63B-2:G63B-1* (----)

G63B-2:G63B-2* (———)
G63B-1:G63B-2* (----)

Fig. 10A
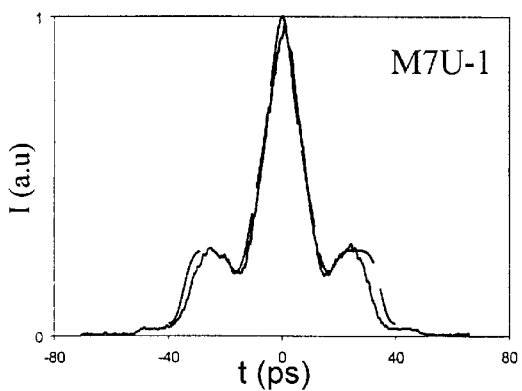
Fig. 10B
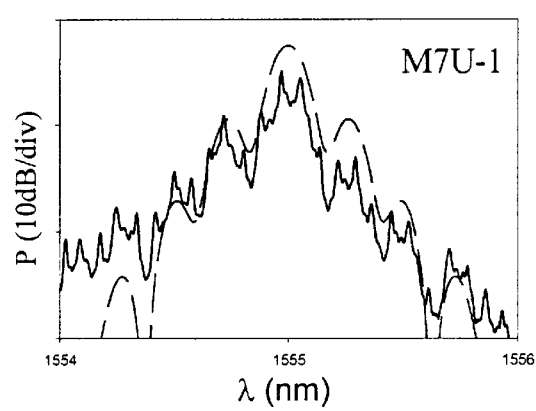
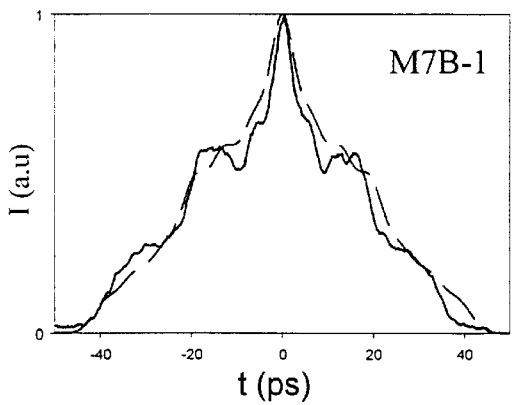
Fig. 10C
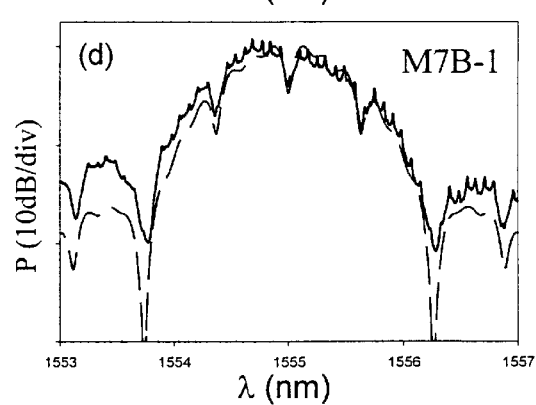
Fig. 10D

G63B-1

G63B-2

M7U-1:M7U-1*

M7B-1:M7B-1*

G63B-1:G63B-1*

G63B-2:G63B-2*

M7B-1:M7B-1*

OPTICAL CODE GENERATION AND DETECTION

BACKGROUND OF THE INVENTION

The invention relates generally to optical code generation and detection as is important for Optical Code Division Multiple Access (OCDMA) and optical packet switching, more especially but not exclusively to grating coders and decoders, and methods of fabricating grating coders and decoders for OCDMA or packet switching.

The explosive growth of the internet over recent years is placing increasing demands on both the capacity and functionality of optical transmission systems and networks. Most work to date has focussed on the use of either Wavelength Division Multiplexing (WDM), optical Time Divisional Multiplexing (OTDM) or a hybrid approach to achieve the Tbit/s aggregate channel capacity required. Now that Tbit/s systems have been demonstrated in the laboratory interest is beginning to grow in investigating alternative multiplexing schemes such as Optical Code Division Multiple Access (OCDMA) which has the potential to further enhance the functionality of optical networks [1–11]. CDMA is a spread spectrum technique that permits a large number of separate users to share the same extended transmission bandwidth but to be individually addressable through the allocation of specific address codes.

CDMA encoding can be performed either in the time domain (direct-sequence DS-CDMA) or frequency domain (frequency-hopping FH-CDMA) [12].

In DS-CDMA each data bit to be transmitted is defined by a code composed of a sequence of pulses. The individual pulses comprising the coded bit are commonly referred to as chips. The coded bits are then broadcast onto the network but are only received by users with a receiver designed to unambiguously recognize data bits of the given specific address code. Address code recognition is ordinarily achieved by simple matched filtering within the receiver.

In FH-CDMA, the carrier-frequency of the chips (or bits) is changed according to a well-defined code sequence that can once again be suitably identified by an appropriate receiver.

CDMA has been applied with great success to the field of mobile communications but has only recently generated significant interest in the optical domain. The particular attractions of OCDMA include the capacity for higher connectivity, more flexible bandwidth usage, improved cross-talk performance, asynchronous access and potential for improved system security.

CDMA for optical telecommunications, i.e. OCDMA, is still at a relatively immature stage of development. A key issue relates to how to reliably generate and recognize appropriate code sequences. (The issue of what constitutes an appropriate code sequence is described further below). To date the most common approach is to use arrays of discrete optical waveguide based delay lines to temporally, or sometimes spectrally, manipulate the individual data bits in order perform the coding and decoding process. In the earliest implementations the delay lines used were simple optical fibers of different lengths appropriately coupled together using fiber couplers [4], [5].

However this approach is not a practical solution due to its limited scalability and the difficulty in obtaining and maintaining adequate accuracy on the length of the individual delay lines.

More recently planar lightwave circuits (PLCs), such as Arrayed Waveguide Gratings (AWGs), have been used to overcome the limiting practical issues discussed above by monolithically integrating the required tunable taps, phase-shifters and combiners onto a single substrate [1,2]. While this is a more practical approach, PLCs are difficult and expensive to fabricate and therefore offer a far from ideal technical solution.

An alternative approach, and one that does not rely upon individual discrete waveguides to provide different paths through the system in order to perform the necessary pulse spreading and shaping, is to use diffractive free space optics. The standard approach is to employ a bulk grating pair to spatially separate, and then recombine, the individual frequency components of a short pulse. A spatial amplitude/phase mask can then be used to perform the necessary filtering functions and to reshape the pulse [6], [7]. However, the approach is again of somewhat limited practical value due to lack of compactness, spectral/temporal resolution and cost.

More recently, 'single beam' encoding and decoding schemes based on fiber Bragg grating (FBG) technology have been proposed and demonstrated. The most straightforward approach is to use an array of FBGs written or spliced in a sequence along a single fiber line [8]. The spatial position of the gratings and their associated reflection profile can then be used to encode both temporal and spectral information onto an incident data pulse. For example a form of fast FH-OCDMA has recently been demonstrated in which the central wavelength of sequential gratings in an encoder/decoder grating array is varied so as to define individual chips within the code [8], [9]. This particular example exploits the wavelength selectivity of the individual gratings and the positioning of the gratings within the array in only a relatively straightforward way that simply uses time-of-flight delay.

However, grating technology has progressed to the point that the optical phase of light reflected from 'individual' gratings can also be exploited, allowing the use of optical phase as a coding parameter (note that this is already possible using PLC technology [1]). Use of phase coding is significant since it is well known that bipolar codes exhibit far better cross-correlation/cross-talk characteristics than amplitude-only unipolar codes, such as those recently reported [11] where superstructured fiber Bragg gratings (SSFBGs) were used to provide an alternative approach to the discrete FBG array based pulse encoders and decoders discussed further above.

FIG. 1 of the accompanying drawings shows the general approach adopted with the unipolar OCDMA reported in the prior art [11]. At the transmitter end, an SSFBG 112 encoding a 7-chip sequence 0100111 is arranged in combination with an optical circulator 110 to receive an input signal pulse 108 and convert it into an encoded signal 116. The encoded signal 116 is conveyed through a transmission link 114 to a receiver. The receiver uses an SSFBG 120 having a 7-chip sequence 1110010 complementary to that of the transmitter-end SSFBG 112 arranged in combination with an optical circulator 118 to receive and decode the encoded signal 116. The decoded signal 120 is then output to any desired standard elements for further processing. The relatively poor performance of the unipolar decoding is schematically represented in the figure by the residual side lobes to the decoded signal 120.

The use of bipolar codes with FBG technology was first demonstrated using a segmented FBG array comprising uniform period gratings with an accurately controlled phase (path-length) between individual gratings [10], [20]. The phase mask used to 'imprint' the grating into the fiber defined the precision of the grating structure in this experiment, which places significant practical limits to the length and accuracy with which such an array could be written, as well as to the flexibility with which gratings with different codes can be written. With this approach [10], [20] a single phase mask is specially fabricated for writing a particular OCDMA signature, the signature being made up of a specific chip sequence. It is therefore necessary to fabricate one phase mask for each coding and decoding signature.

A better way of fabricating optical waveguide gratings incorporating bipolar or higher order multipolar OCDMA signatures is therefore desired.

SUMMARY OF THE INVENTION

According to one aspect of the invention there is provided a method of fabricating an optical waveguide grating for encoding or decoding an optical signal by writing a succession of grating sections into a photosensitive waveguide, each grating section representing a chip of a code signature, the method comprising:

(a) writing a first grating section into the photosensitive waveguide by repeatedly exposing an inscription beam having a periodic intensity pattern onto a first length of the waveguide and moving the inscription beam relative to the waveguide between successive exposures or groups of exposures, such that the first grating section comprises a plurality of grating lines, each of at least a majority of which is produced by multiple exposures; and (b) writing further grating sections into further lengths of waveguide, each further grating section either being in phase with, or having a predetermined phase shift relative to, the preceding grating section, depending on whether the code signature has a change in polarity between chips.

The above-described continuous grating writing method allows essentially continuous amplitude and phase control along an individual grating structure. The technique is far more flexible from a fabrication perspective than other techniques so far demonstrated, in particular techniques which require fabrication of special phase masks incorporating structure needed to reproduce a multi-chip code, e.g. an OCDMA code, packet header code, of tens or hundreds of chips. A special phase mask would have to be fabricated for each code/decode pair, which clearly becomes increasingly expensive and inconvenient as the number of codes increases, as it will do as OCDMA and optical packet switching technology matures.

The proposed approach therefore allows for a far broader range of codes, and potential coding schemes. Most significantly it is also not bounded by the current resolution limits and device lengths imposed by phase mask technology and offers great potential for the production of low cost devices. Specific examples of codes with 63 chips are presented. Longer codes of 128 chips have also been successfully fabricated indicating that the novel fabrication method can provide the large code length gratings demanded by future applications.

In embodiments of the invention, the predetermined phase shifts are pi phase shifts. However, other phase shifts could be used. For example, the predetermined phase shifts comprise at least two different phase shifts.

The modulated refractive index profile may have a substantially constant amplitude modulation, thereby to provide multipolar (e.g. bipolar) coding purely through phase modulation, with no amplitude modulation component. Alternatively, coder and decoder gratings may be fabricated with modulation being implemented with phase and amplitude modulation.

As well as bipolar coding, higher level coding may be provided. For example, quadrupolar coding may be provided with quaternary phase shift keying (QPSK).

The photosensitive optical waveguide is preferably an optical fiber, but may be a solid state device such as a planar waveguide.

The code signature may be any number of chips to provide the desired number of independent user codes. For example, the number of chips may be at least 10, 20, 30, 40, 50, 60. Specifically, the number of chips may be at least 63 chips.

In some embodiments, the code signature is written in NRZ format with phase continuity in the refractive index modulation profile between adjoining grating sections representing adjacent chips of like polarity.

In other embodiments, the code signature is written in RZ format. This may be done by suitable manipulation of amplitude or phase in the refractive index modulation profile between adjacent chips of like polarity.

According to another aspect of the invention there is provided a grating for encoding or decoding optical signals, comprising a photosensitive optical waveguide with a modulated refractive index profile comprising a plurality of sections representing chips of a code signature, characterized in that changes in polarity between chips are implemented by pi phase shifts in the modulated refractive index profile, thereby to provide multipolar coding through phase modulation.

According to a further aspect of the invention there is provided a grating for encoding or decoding optical signals, comprising a photosensitive optical waveguide with a modulated refractive index profile comprising a plurality of sections representing chips of a code signature, characterized in that the grating has at least 10, 20, 30, 40, 50, 60 or 63 chips. The gratings may be unipolar or bipolar.

The apparatus and method can also include one or more of the following features:

1. Incorporation of both dispersion-compensating and encoding or decoding gratings into a single superstructure grating.
2. Addition of multiple codes within a single grating—for example two codes at different central wavelengths.
3. Further extension of either the grating length or reduction in chip size to increase the code length to codes of greater than 5000 chips, or more, allowing rapid increases in simultaneous users.
4. More complex superstructure profiles including amplitude and phase features to shape controllably the individual chip shapes.
5. Incorporation of simultaneous additional, multiple functionality with a single grating (decoding or coding) structures e.g. loss compensation and dispersion compensation ($2^{nd}$ and $3^{rd}$ order).
6. The apparatus may be reconfigured such that the superstructure grating as above is used in transmission mode rather than reflective mode.
7. To use higher reflectivity versions of the decoder/coder gratings designed using more advanced design algorithms (e.g. inverse scattering techniques) other than by the Fourier approach.

8. To use cascades of one or more code/decode gratings.
9. Use advanced codes such as those developed by the mobile-communications community for optimized correlation function definition e.g. M-sequences, Gold sequences or Kasami codes.
10. Use a combination of a decoder grating and nonlinear element such as a semiconductor optical amplifier or fiber-based nonlinear switch to enhance the correlation contrast and effect further enhanced processing functions such as optical routing, header removal and rewrite, data packet loading.
11. Use parallel arrays of coder-decoder gratings to enhance multi-user operation.
12. Use of coder/decoder approach to allow reduction of nonlinear optical effects by extending the bit duration in the time domain, thereby reducing optical intensities.
13. Use superstructure gratings to shape optical pulses (that may be of non-optimal form) for a given transmission technique or optical processing function to a more-desirable functional form for onward transmission or processing, e.g. chirped pulse to transform limited pulse conversion, soliton to super-Gaussian pulses, soliton to dispersion solitons, Gaussian pulses to square pulses.
14. Extend the grating bandwidths of code-decode grating to up to 200 nm or further.
15. Extend technique to other wavelength regimes in the range 700 nm to 2000 nm or further.
16. Extend the superstructure decoding technique to correlate (provide matched filtering) directly with the output from a modulated optical source. For example the source can be a directly modulated gain-switch diode, and externally modulated DFB laser, a mode-locked fiber ring laser with external modulation.
17. Addition of wavelength division multiplexers and demultiplexers such as arrayed waveguide gratings to facilitate multi-wavelength operation, with one or more wavelengths being operated under the code-division multiplexing technique described previously.
18. Operation of the system with synchronous transmitters and receivers.
19. Operation of the system with asynchronous transmitters and receivers.
20. Operation of the system with a combination of synchronous and asynchronous transmitters and receivers.

Aspects of this invention include a grating for use in code division multiplexing (CDM) system architectures, a method of using gratings in CDM systems architectures, a CDM architecture for optical communications, or a combined CDM and WDM system architecture for optical communications.

By CDM we mean not only code-division multiplexing but also include ultrafast packet-switched, or other OTDM networks or transmissions systems.

In conclusion:
Superstructure FBG technology enables high coding/decoding performance.
Flexibility in code design and device fabrication—code profile is determined by appropriate UV exposure, not phase mask.
Direct comparison of unipolar vs. bipolar operation.
Error-free 10 Gbit/s pulse coding/decoding over 25 km of single mode fiber (SMF) with 160 Gchip/s code.
255-chip or longer codes possible using cm-long FBG's and shorter chip durations.
Applications: OCDMA, header recognition in packet-switched networks, etc.

In the following detailed description, results are presented from specific examples of bipolar OCDMA, which show higher data rates (10 Gbit/s), shorter chip-lengths (6.4 ps) and far longer code sequences (63 bits) than previously demonstrated. To highlight the dramatic improvements achieved with the novel fabrication process for bipolar OCDMA gratings, results are also presented for comparable unipolar structures.

BRIEF DESCRIPTION OF THE DRAWINGS

For a better understanding of the invention and to show how the same may be carried into effect reference is now made by way of example to the following accompanying drawings.

FIG. 10A plots second harmonic generation (SHG) intensity I against time t to provide autocorrelation traces of the encoded waveforms of the unipolar grating M7U-1 for 2.5 ps soliton input pulses.

FIG. 10B plots the spectral power response of the encoded waveforms for the unipolar grating M7U-1 (solid lines: experimental measurements, dashed lines: theoretical plots). The 10 Hz periodic structure on the spectral envelope of the experimental measurements results from the 10 Gbit/s modulation of the signal.

FIG. 10C corresponds to FIG. 10A, but is for the bipolar grating M7B-1.

FIG. 10D corresponds to FIG. 10B, but is for the bipolar grating M7B-1.

DETAILED DESCRIPTION

Figure 1:
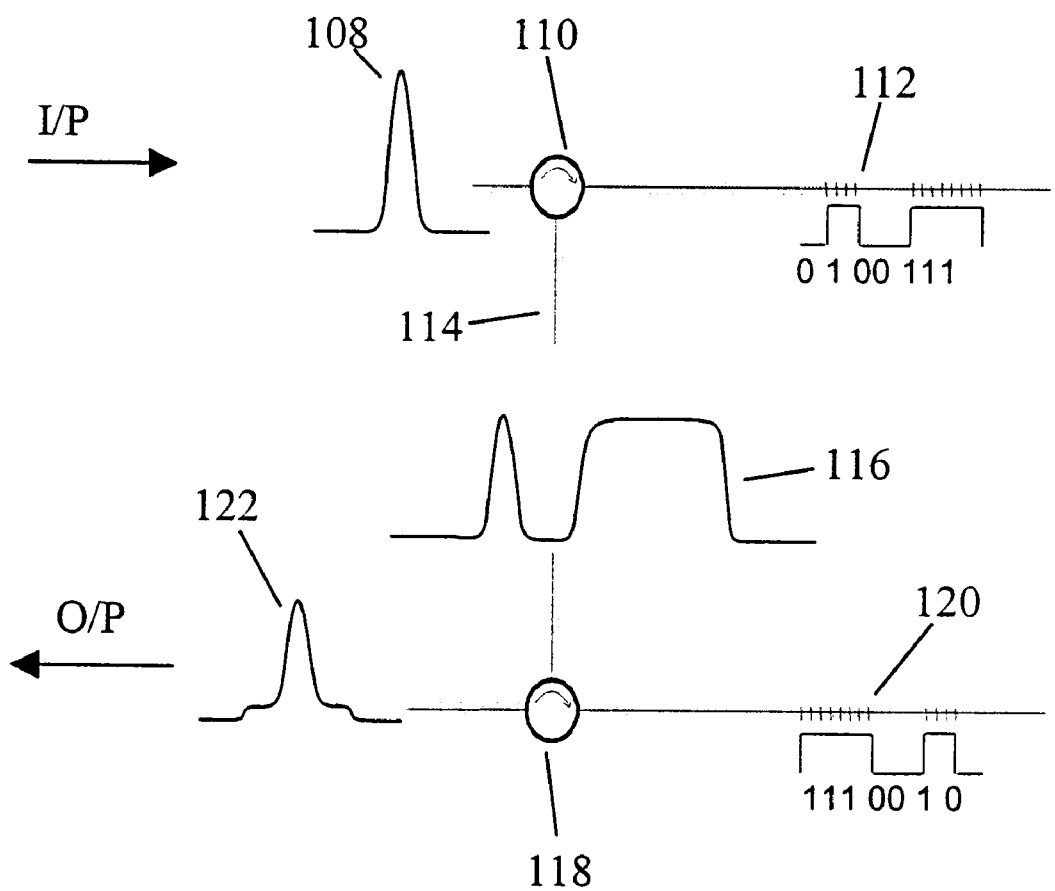
FIG. 1 shows schematically the physical approach of pulse encoding and decoding using SSFBGs according to the prior art.

The detailed description is organized as follows: In Section I theoretical background and simulations of the encoding and decoding schemes demonstrated in the later sections of this paper are outlined. In Section II experiments are described together with details of gratings fabricated for use within the experiments. In Section III results are presented of various optical code generation and recognition experiments as well as results from transmission experiments. In Section IV there is described in detail a process used for fabricating the OCDMA coder/decoder gratings. In Section V an optical packet switching example is given. In Section VI an example of a combined amplitude and phase modulated grating is given. In Section VII an example of a quadrupolar grating is given. In Section VIII conclusions are drawn and a discussion is given of further extensions and applications of this powerful new technology to optical network applications.

Section I: Theoretical Background

A superstructured fiber Bragg grating (SSFBG) is defined as a standard fiber grating, i.e. a fiber with a rapidly varying refractive index modulation of uniform amplitude and pitch, onto which an additional, slowly varying refractive index modulation profile has been imposed along its length. In the weak SSFBG grating limit, i.e. where the grating strength is such that light penetrates the full grating length and the individual elements of the grating contribute more or less equally to the reflected response, the wavevector response $F(\kappa)$ can be shown to be given simply by the Fourier transform of the spatial superstructure refractive index modulation profile $A(x)$ used to write the grating [14] i.e.

$$F(\kappa) = \frac{1}{2\pi} \int_{-\infty}^{+\infty} A(x) e^{j\kappa x} dx \qquad (1)$$

The uniform rapid refractive index modulation simply defines the central frequency/wavelength of the grating's reflection band. Similarly, the impulse response of a fiber grating $h(t)$ is given by the inverse Fourier transform of its frequency response $H(\omega)$ $$h(t) = \int_{-\infty}^{+\infty} H(\omega) e^{-j\omega t} d\omega \qquad (2)$$

From the above equations and the fact that $\kappa$ the wavevector is proportional to the optical frequency $\omega$ it is clear that the impulse response of a weak grating has a temporal profile given by the complex form of the refractive index superstructure modulation profile of the grating. For example, in the instance that the grating superstructure is simply amplitude modulated, i.e. the grating phase is uniform (such gratings are referred to as unipolar coded herein), the impulse response follows precisely the amplitude modulation profile used to write the grating [11]. (The scaling factor $t=2nx/c$ is used to convert from the spatial to temporal domain where n is the refractive index and c is the speed of light).

When a short but finite bandwidth pulse, (i.e. not an impulse pulse) is reflected from a SSFBG it is transformed into a pulse with a temporal shape given by the convolution between the input pulse and the impulse response of the grating i.e.

$$y(t)=x(t)*h(t) \qquad (3)$$

the process is described in the frequency domain by the product of the Fourier transform of the incident signal $X(\omega)$ with the frequency response of the grating $H(\omega)$ $$Y(\omega)=X(\omega)H(\omega) \qquad (4)$$

Figure 2A:
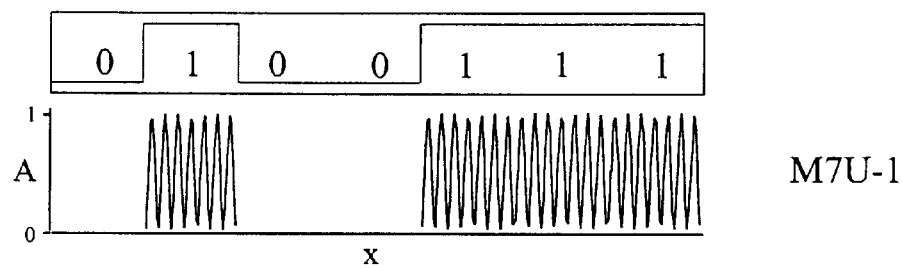
FIG. 2A is a schematic example of a unipolar code M7U-1 showing temporal code (upper trace) and the corresponding refractive index modulation profile along the SSFBG structure (lower trace). The graph plots refractive index modulation A against position along the grating x.
Figure 2B:
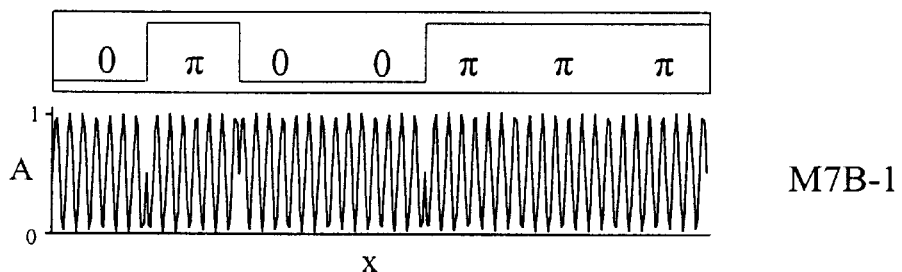
FIG. 2B is a schematic example of a bipolar code M7B-1 showing temporal code (upper trace) and the corresponding refractive index modulation profile along the SSFBG structure (lower trace). The graph plots refractive index modulation A against position along the grating x.

FIGS. 2A and 2B show two example gratings in terms of their refractive index modulation $A(x)$. Above each graph of the refractive index modulation, the corresponding chip signature is also plotted. The pulse reflection from these two gratings is considered theoretically. These two gratings correspond to two particular gratings used within the experiments described in the following. For the cases described in the experiments, the period of the refractive index modulation was $\Lambda=\sim520$ nm, and the chip length $L_{chip}=0.66$ mm.

The grating M7U-1 is a pure amplitude-modulated grating (unipolar coded) following the approach of the prior art [11]. The grating contains seven discrete sections defining respective ones of the 'spatial' OCDMA chips. Each grating section exhibit either full, or zero, refractive index amplitude modulation depending on the sign of the spatial chip.

The grating M7B-1, which is an example of the present invention, has a uniform amplitude refractive index level along its length but discrete $(+/-\pi)$ jumps in phase written into the grating at the boundaries of adjacent spatial chips, subject to the same chip pattern (code) as grating M7U-1. This specific form of SSFBG modulation is referred to herein as bipolar coding.

Figure 2C:
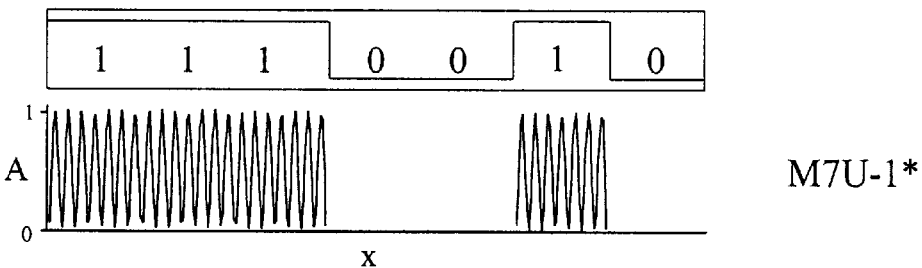
FIG. 2C is a schematic example of a unipolar code M7U-1* which is a filter matched to M7U-1 showing temporal code (upper trace) and the corresponding refractive index modulation profile along the SSFBG structure (lower trace). The graph plots refractive index modulation A against position along the grating x.

FIG. 2C, by way of comparison, plots the conjugate 'decoder' grating (M7U-1*) to that of FIG. 2A (M7U-1), as will be understood from the prior art [11].

In both gratings the spatial chip lengths are set to be 0.66 mm corresponding to a temporal chip duration of 6.4 ps.

Figure 3A:
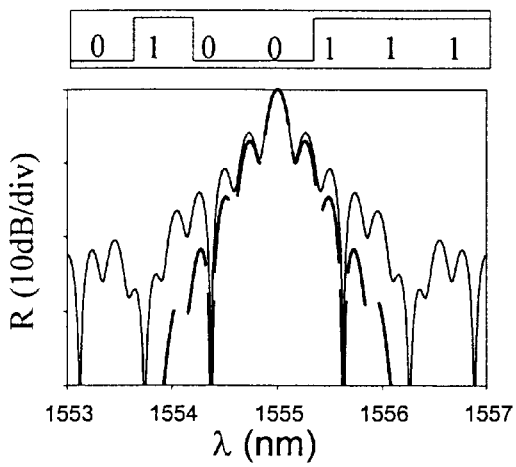
FIG. 3A shows calculated reflectivity spectrum (solid line) and spectral response to 2.5 ps soliton pulses (dashed line) for the unipolar grating M7U-1. The corresponding superstructure profile is shown inset.
Figure 3B:
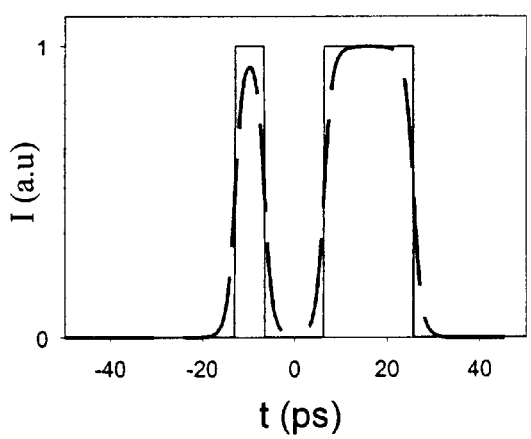
FIG. 3B shows calculated impulse response (solid line) and temporal response to 2.5 ps soliton pulses (dashed lines) for the unipolar grating M7U-1.

FIGS. 3A and 3B plot the theoretical impulse response and optical power reflectivity spectrum of the unipolar grating (M7U-1) shown in FIG. 2A, and the resulting reflected optical power spectrum and temporal response after excitation with 2.5 ps soliton pulses (dashed lines). FIG. 3A plots reflectivity R as a function of wavelength $\lambda$. FIG. 3B plots intensity I in arbitrary units (a.u.) as a function of time t.

Figure 3C:
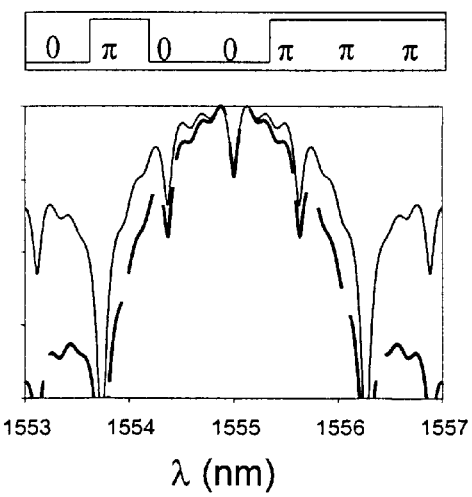
FIG. 3C corresponds to FIG. 3A, but is for the bipolar grating M7B-1.
Figure 3D:
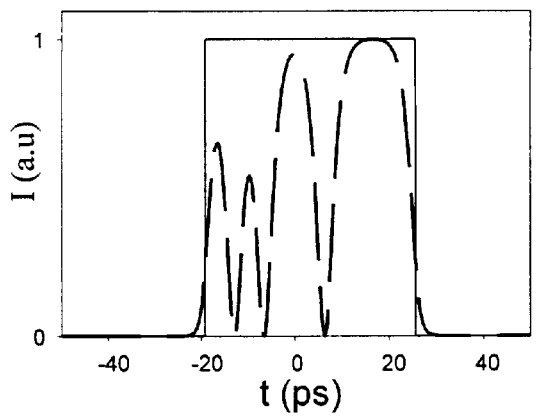
FIG. 3D corresponds to FIG. 3B, but is for the bipolar grating M7B-1.

FIGS. 3C and 3D are corresponding plots for the bipolar grating shown in FIG. 2B.

The relations between the superstructure refractive index modulation profiles and the gratings' temporal response are clear for both grating modulation formats. The reduced temporal feature resolution, and additional code-sequence amplitude profiling, due to the use of finite bandwidth optical pulses to excite the gratings is also apparent.

In order to perform all-optical pattern recognition of the temporal code sequences the encoded waveform is reflected from a second SSFBG (the decoder) with a frequency response $G(\omega)$ and associated impulse response $g(t)$. In the frequency domain the overall response of the system is given by $$R(\omega)=Y(\omega)G(\omega) \qquad (5)$$

from which it is clear that if an impulse response excitation of the encoder grating is used and $G(\omega)=Y^*(\omega)=H^*(\omega)$ then $r(t)$ is the autocorrelation function of the superstructure profile used to write the encoder grating with the impulse response of the decoder grating, $g(t)=h(-t)$. Physically, this requirement dictates that the superstructure function of the decoder grating is the spatially reversed form used to write the encoder grating (see FIGS. 2A and 2C). Our principle of pattern recognition is thus nothing more than simple matched filtering. Note that if $G(\omega)$ is different from $H^*(\omega)$ then the resultant waveform represents the cross-correlation function of the two different grating superstructure profiles (codes). Note also that $r(t)$ has a total temporal length of two times the code length.

In order to achieve good high contrast code recognition one needs to restrict the use of codes within the system to those which have both distinct autocorrelation features with a single dominant, well-defined autocorrelation peak, and low peak level mutual cross-correlation functions. This requirement also exists within radio based direct sequence CDMA and the chip patterns used are usually the well known M-sequences, or are based on combinations of M-sequences such as Gold codes, Kassami codes or Walsh-Hadamard codes, which are known to have such properties [15], [16]. Such codes are also applicable to OCDMA. The quality of the code recognition and the number of 'orthogonal' codes supported by a given code length is a strong function of the code length, and 'degree of polarity' (i.e. the number of possible coding levels) of the implementation. Both of these properties improve significantly with the use of longer codes and increasing degrees of polarity.

Figure 4A:
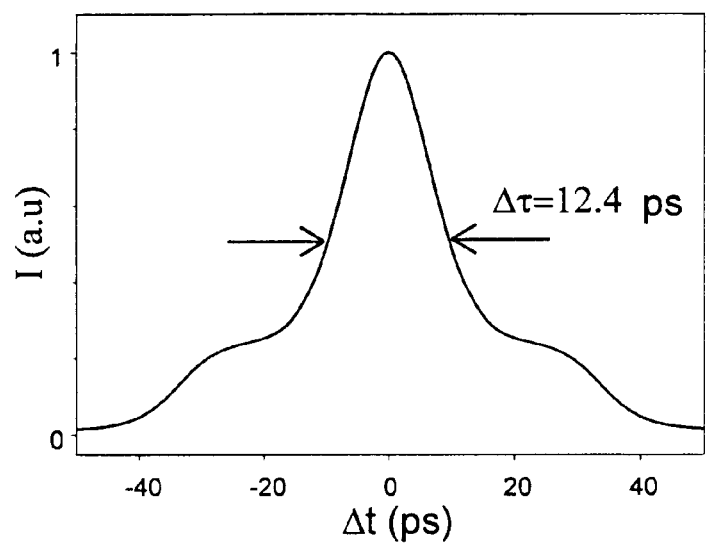
FIG. 4A is a calculated trace showing intensity I against time delay $\Delta t$ of a decoded signal generated from 2.5 ps soliton input pulses for the grating combination M7U-1:M7U-1*.
Figure 4B:
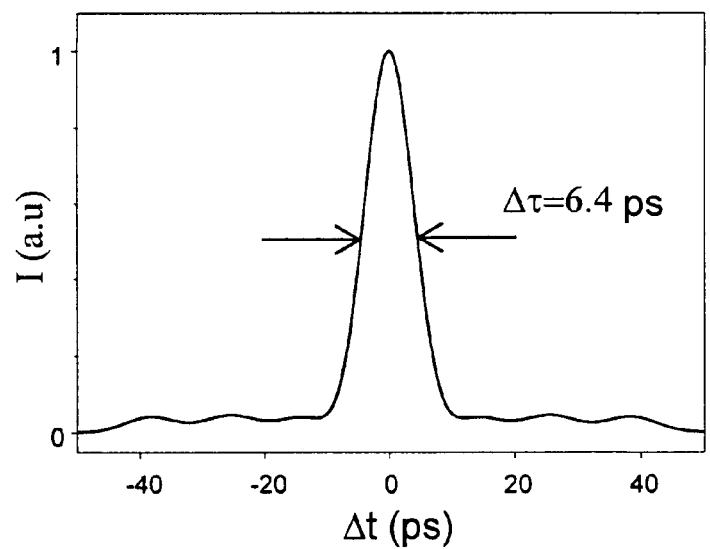
FIG. 4B corresponds to FIG. 4A but is for the grating combination M7B-1:M7B-1*.

FIGS. 4A and 4B explicitly illustrate these features by plotting the response of the decode gratings to the pulse patterns generated from the relevant encoder grating after the have themselves been excited with 2.5 ps pulses (see FIGS. 3B and 3D respectively). The plots are of second harmonic generation (SHG) intensity I in arbitrary units as a function of delay time Δt.

In both FIGS. 4A and 4B a well-defined pulseform is obtained with a single distinct autocorrelation feature. Even with this relatively short code length the benefits of bipolar coding are self evident in terms of contrast between the correlation peak and the background. For a 7-bit M-sequence there are only 2 'orthogonal' codes, which is clearly impractical for most real applications. However the number of orthogonal codes increases rapidly with code length.

Figure 5A:
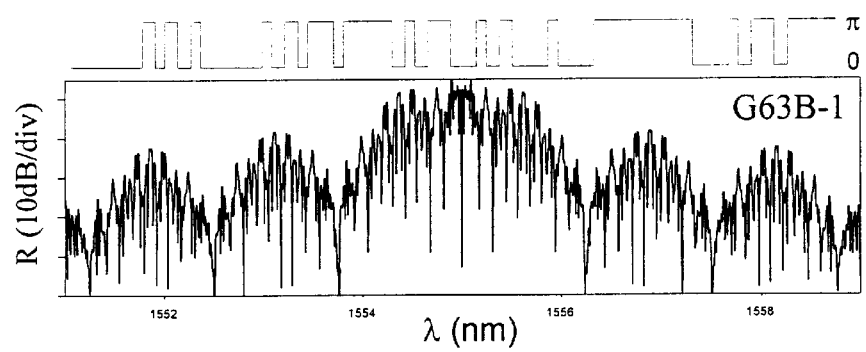
FIG. 5A shows the superstructure profile (upper trace) and the corresponding calculated reflectivity spectrum (lower trace) for the bipolar grating G63B-1.
Figure 5B:
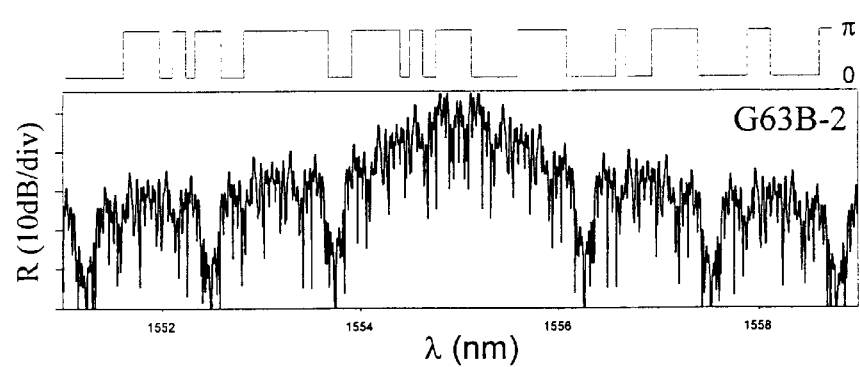
FIG. 5B corresponds to FIG. 5A, but is for the bipolar grating G63B-2.

FIGS. 5A and 5B plot the theoretical superstructure profile and optical power reflectivity profiles R as a function of wavelength λ of two 'orthogonal' 63-bit Gold-code bipolar sequences G63B-1 and G63B-2. Note the complex, many peaked reflectivity profiles which result from the numerous discrete phase jumps. For an N-chip Gold sequence there are N+2 such 'orthogonal' codes [1].

Figure 6A:
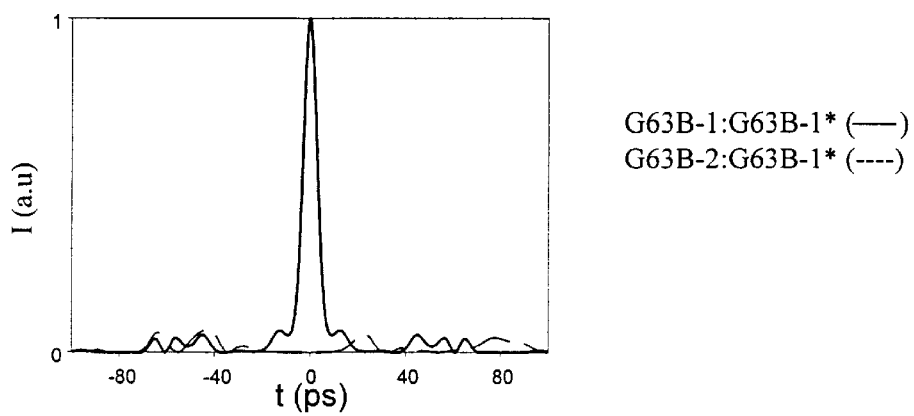
FIG. 6A shows the calculated traces of the signal after the code:decode process for 2.5 ps soliton input pulses for the grating combinations: G63B-1:G63B-1* (solid line) and G63B-2:G63B-1* (dashed line).
Figure 6B:
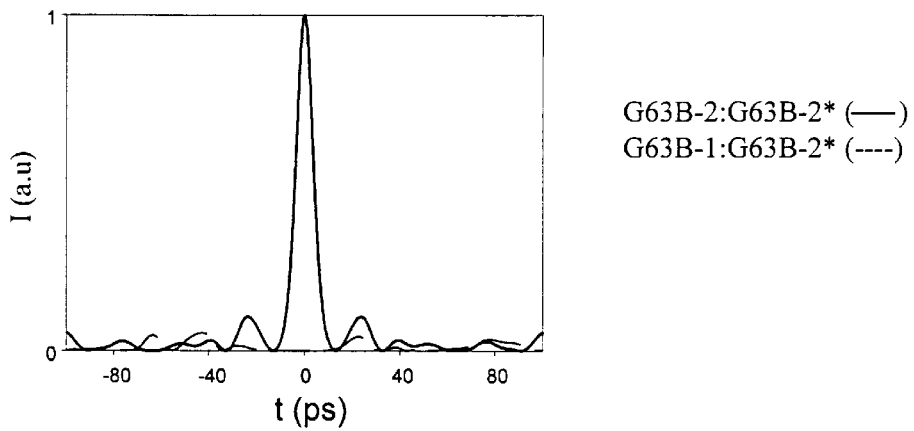
FIG. 6B shows the calculated traces of the signal after the code:decode process for 2.5 ps soliton input pulses for the grating combinations: G63B-2:G63B-2* (solid line) and G63B-1:G63B-2* (dashed line).

FIGS. 6A and 6B plot the theoretically predicted responses (intensity I in arbitrary units v. time t) resulting from the code:decode process for 2.5 ps input pulses for the following combinations of coding and decoding gratings: G63B-1:G63B-1* and G63B-2:G63B-1* (FIG. 6A) while G63B-2:G63B-2* and G63B-1:G63B-2* (FIG. 6B).

The form of labeling A:B* indicates grating A for the encoder, and the conjugate grating of grating B as the decoder. This labeling convention is used throughout this document.

Comparing FIGS. 4A and 4B and FIGS. 6A and 6B, it can be seen that use of the longer 63 chip code sequence provides much better autocorrelation than achievable with a 7 chip code. Moreover, the absence of any significant peak on the cross-correlation profile also shows that much higher pulse code discrimination can be achieved.

Having theoretically demonstrated the principle and potential of using SSFBG technology for coding:decoding applications, the critical question is whether SSFBG fabrication technology can be developed that is capable of fabricating sufficiently precise gratings to allow OCDMA to be practiced with chip rates, bit rates and code lengths of practical interest. In the following section, it is shown that such precise gratings have been fabricated. Specifically, experimental results are presented which show that, by use of novel fabrication techniques, high quality coder/decoder gratings have been fabricated with 63 chips.

Section II: Experimental Set-Up

Figure 7:
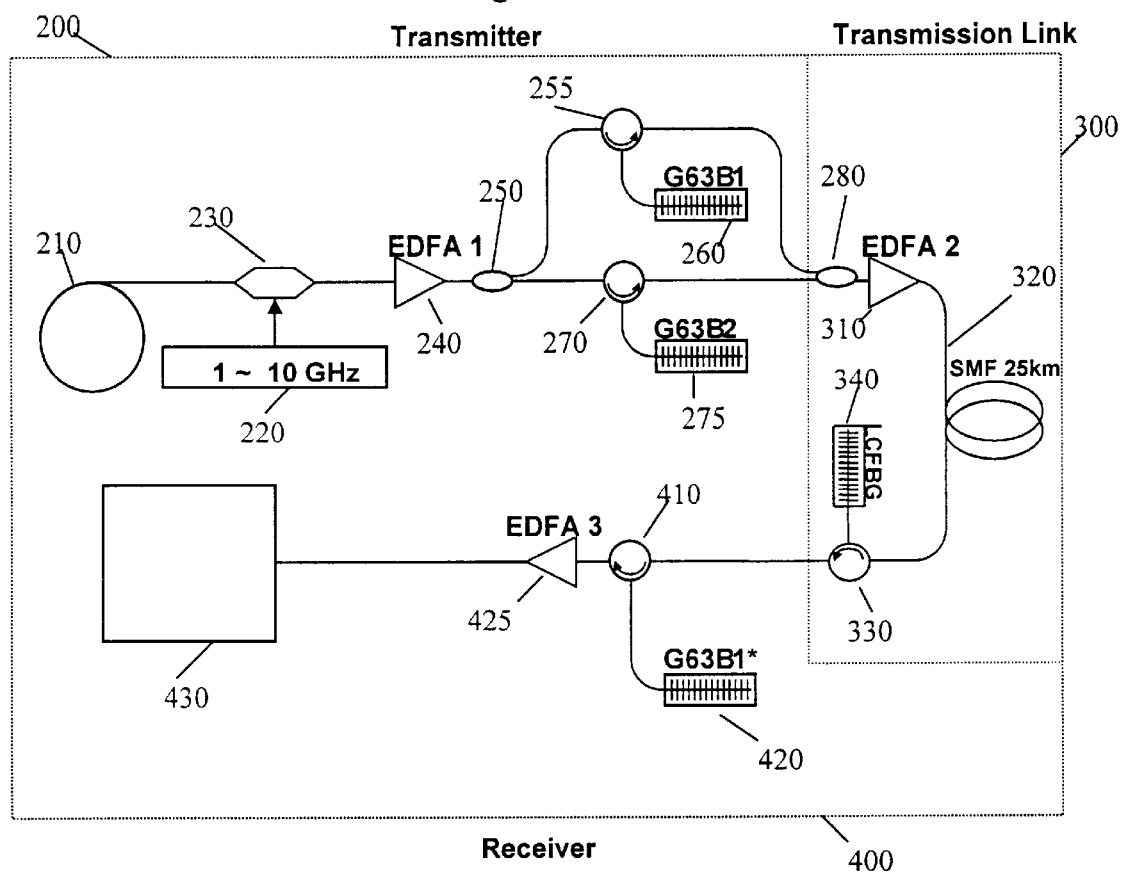
FIG. 7 shows the set-up used for performing the experiments.

FIG. 7 shows the basic experimental set-up comprising a transmitter part 200, a transmission link part 300 and receiver part 400.

The transmitter part 200 comprises a mode-locked erbium-doped soliton fiber laser (EFRL) 210 supplying a light signal to a modulator 230 external to the laser, the modulator being schematically illustrated as a single stage Mach-Zehnder modulator in the drawing. The modulator is controlled by an external electronic signal from a pulse generator 220 operable in the frequency range 1–10 GHz. The modulated optical signal is then supplied to an erbium doped fiber amplifier (EDFA 1) 240 and thence to a 50:50 fiber coupler 250 which supplies components of the modulated optical signal to first and second OCDMA coder gratings (C1 and C2) 275 and 260 via respective optical circulators 270 and 255. The signal is thus directed from the circulators to the grating concerned, whereupon an OCDMA code is impressed on the signal by reflection and the reflected signal component directed onward by the circulators. The OCDMA coded signal components are then recombined at a further 50:50 coupler 280 and supplied together to the transmission link 300.

The transmission link 300 is simulated in the experiments by provision of an erbium doped fiber amplifier (EDFA 2) 310 followed by a 25 km length of single mode fiber (SMF) 320 and a linearly chirped fiber Bragg grating (LCFBG) 340 for post dispersion compensation, being arranged in the transmission link with a circulator 330 as is conventional.

The receiver part 400 comprises a decoder grating (C1*) 420 for decoding the signal encoded by grating (C1) 275 at the transmitter to perform the code recognition by auto-correlation, and similarly to discriminate out the signal encoded by grating 260 (C2) by cross-correlation. The decoder grating C1* is arranged in reflection with a circulator 410. The decoded signal is then supplied to an erbium doped fiber amplifier (EDFA 3) 425 and further to diagnostics 430 for testing the system.

The amplifiers (EDFAs 1, 2 and 3) are incorporated within the system at appropriate positions to compensate for the various sources of loss such as the transmission line, optical circulator insertion loss and coupler splitting ratios.

The transmitter (soliton laser +external modulator) could be used to generate either continuous pulse trains of 2.0–2.5 ps, transform limited soliton pulses at predetermined frequencies in the range 0.5 to 10 GHz, or pseudorandom data at predetermined data rates in the range 1 to 10 Gbit/s. This data stream was then coded using an SSFBG, and either decoded immediately using a matched grating, or transmitted over some distance, and then decoded. The pulse shaping properties (temporal and spectral), and bit-error rate performance at various points throughout the system were characterized using: a fast pin-diode and sampling scope of ~20 GHz combined bandwidth; a Second Harmonic Generation (SHG) autocorrelator (<100 Fs resolution); an optical spectrum analyzer; and, where appropriate, a 10 Gbit/s receiver and Bit-Error Rate Test set (BERT).

It will be appreciated that in a real system, at the transmitter, a bank of coder gratings C1, C2, . . . Cn would be used and, at the receiver, the diagnostics would be replaced with appropriate signal handling devices. Moreover, further receivers would be provided, each with one or more decoder gratings Ck, Cm etc.

A range of different gratings were produced to test within our set-up, as tabulated in Table 1 below:

TABLE 1

| Grating | Type | Code Sequence | Code Length | Chip Length (mm) | Grating Length (mm) | Normal Reflectivity |
|---------|------|---------------|-------------|------------------|---------------------|---------------------|
| M7U-1   | Unipolar | M-Sequence | 7 | 0.66 | 4.62 | 3% |
| M7U-1*  | Unipolar | M-Sequence | 7 | 0.66 | 4.62 | 3% |
| M7B-1   | Bipolar  | M-Sequence | 7 | 0.66 | 4.62 | 50% |
| M7B-1*  | Bipolar  | M-Sequence | 7 | 0.66 | 4.62 | 50% |
| G63B-1  | Bipolar  | Gold Sequence | 63 | 0.66 | 41.58 | 20% |
| G63B-1* | Bipolar  | Gold Sequence | 63 | 0.66 | 41.58 | 20% |
| G63B-2  | Bipolar  | Gold Sequence | 63 | 0.66 | 41.58 | 20% |
| G63B-2* | Bipolar  | Gold Sequence | 63 | 0.66 | 41.58 | 20% |

The novel method used to fabricate these gratings is described further below in Section IV.

To experimentally study the differences between bipolar (phase) codes according to the invention and unipolar (amplitude) codes (as already known in the prior art [11]), the 7-chip structures with profiles as shown in FIGS. 2A and 2B were fabricated, along with their matched filter pairs.

Both the unipolar and bipolar SSFBGs were fabricated based on the so-called continuous grating writing technique [13, 20], as described in more detail in Section IV below. This technique effectively writes gratings on a grating plane by grating plane basis and allows for the fabrication of gratings with truly complex refractive index profiles [17]. The technique uses a simple phase mask with uniform pitch and relies upon precise control of the positioning of the fiber relative to the mask and controlled exposure to the index modifying UV light used to write the grating. A single phase mask can thus be used to write a wide range of complex grating structures. Indeed all of the gratings described herein, including the dispersion compensating grating used for our transmission experiments, were written using a single uniform-pitch phase mask. This is to be contrasted with traditional grating fabrication techniques where the induced refractive index pattern is written into the phase mask itself, and simply imprinted into the fiber [10], [20]. The conventional approach limits both the quality and the length of the gratings that can be written to those that can be achieved for current phase-mask production itself, which is considerably inferior to what can be achieved using our fiber Bragg grating writing technique. The practical benefits of the approach adopted here regarding flexibility, manufacturability and grating quality are striking.

SSFBGs are obtained by modulating the slowly varying amplitude/phase envelope (on the rapidly varying) refractive index profile of an otherwise uniform grating. As discussed previously the impulse response of a weakly reflecting SSFBG (reflectivity typically <20%) is given directly by the superstructure modulation profile used to write the grating. The total grating length in each instance was 4.63 mm (corresponding to a temporal code duration of 44.8 ps) and the individual chip width was 0.66 mm, corresponding to a temporal chip length of 6.4 ps. (This is to be compared with a temporal chip length of ~200 ps in earlier experiments).

Figure 8A:
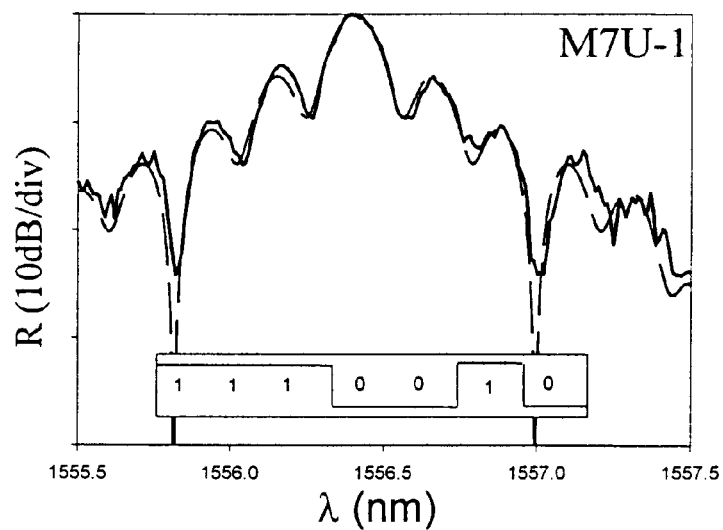
FIG. 8A shows reflectivity R as a function of wavelength $\lambda$ for the unipolar grating M7U-1 (solid lines: experimental measurements, dashed lines: theoretical plots). The superstructure profile (chip sequence) is shown inset.

FIG. 8A shows the amplitude modulated superstructure reflectivity profile used to write the unipolar code grating M7U-1 (inset) as well as the corresponding theoretical and experimental power reflectivity profiles (main graph). The matched filter grating M7U-1* was written with the same profile.

Figure 8B:
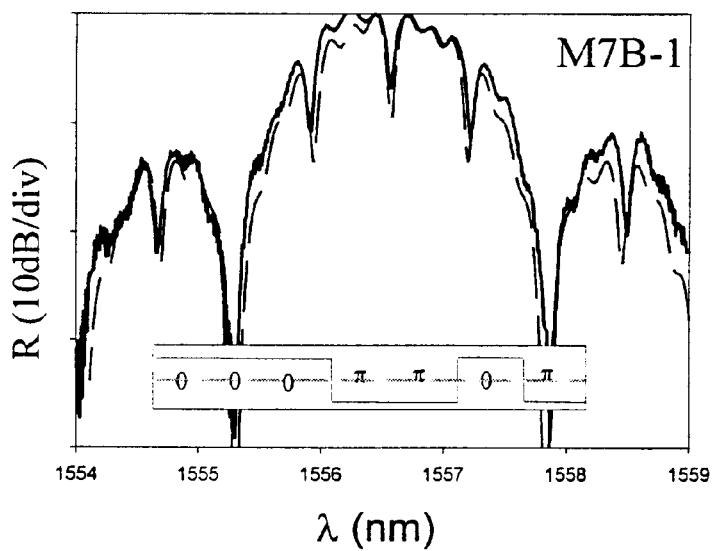
FIG. 8B corresponds to FIG. 8A, but is for the bipolar grating M7B-1.
Figure 9A:
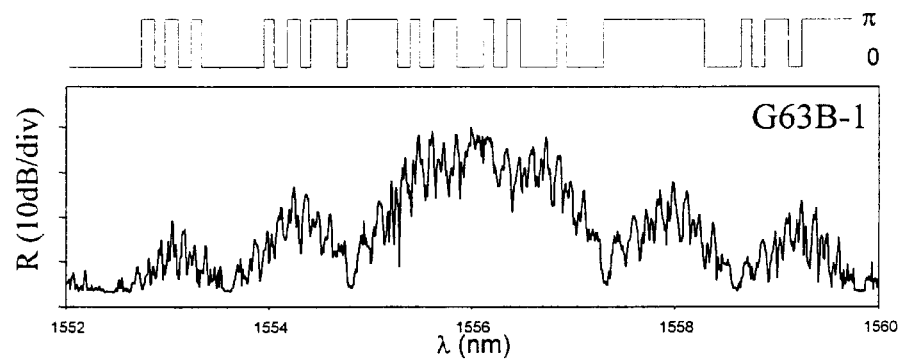
FIG. 9A shows reflectivity R as a function of wavelength $\lambda$ (lower trace) as well as the corresponding superstructure profile (upper trace) for the bipolar grating G63B-1
Figure 9B:
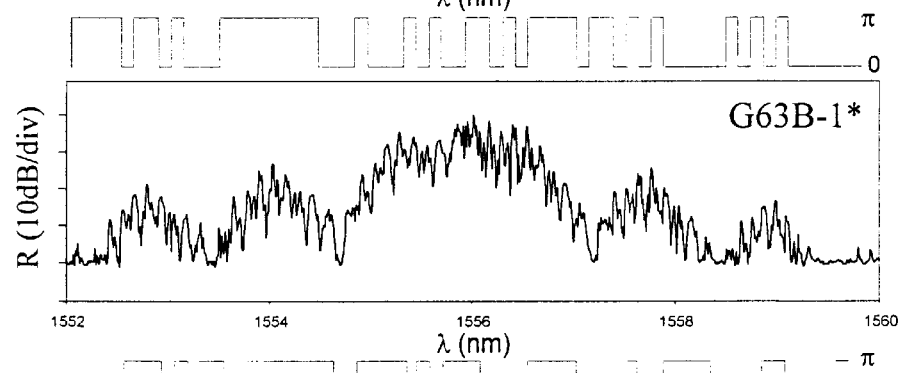
FIG. 9B corresponds to FIG. 9A, but is for the bipolar grating G63B-1*.
Figure 9C:
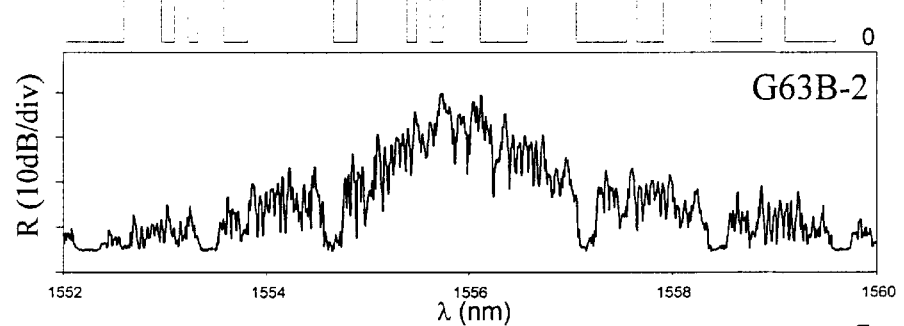
FIG. 9C corresponds to FIG. 9A, but is for the bipolar grating G63B-2.
Figure 9D:
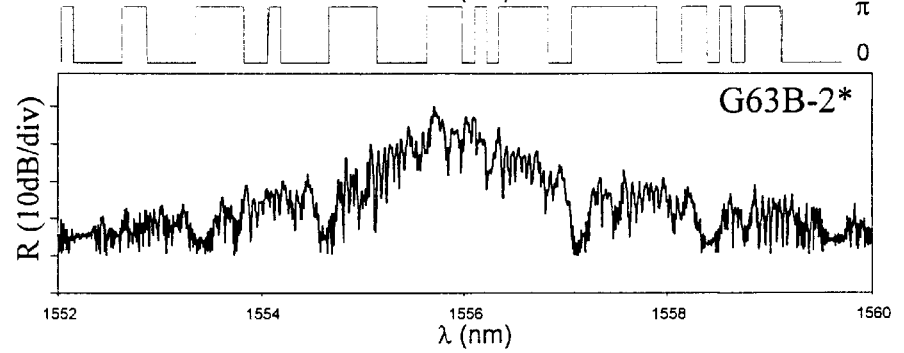
FIG. 9D corresponds to FIG. 9A, but is for the bipolar grating G63B-2*.

FIG. 8B is a corresponding figure for the bipolar grating M7B-1. The matched filter grating M7B-1* was written with the same profile. The gratings M7B-1 and M7B-1* are pure phase encoded structures with discrete $\pi$ phase shifts at those ones of the chip boundaries where transitions occur.

The example profiles shown are for NRZ modulation. Alternatively, RZ modulation could be implemented, for example by amplitude attenuation, or by phase manipulation, at every chip boundary where there is no transition.

The agreement between the theoretical and experimental spectral responses of both sets of 7-bit SSFBG types is seen to be excellent, highlighting the precision of the novel grating writing process used to fabricate the OCDMA coder/decoder gratings.

It is also noted that the absolute reflectivity of the M7B-1 and M7B-1* gratings is ~50% (due to the use of a high photosensitivity fiber) which is significantly higher than the quoted upper limit generally considered for the weak-grating Fourier design approach to be reliable. However, even at this higher level of reflectivity the gratings are still found to perform well.

The second sets of encoding:decoding gratings to be produced were nominally identical to the above-described 7-bit bipolar encoded gratings in terms of chip length (0.66 mm=6.4 ps) and wavelength, only much longer both in terms of number of chips (63) and correspondingly physical length (~42 mm), and were made to the theoretical designs shown in FIG. 5A and FIG. 5B.

FIGS. 9A to 9D show the spectral responses of four of the 63-chip gratings tabulated above. The spectral response curves show reflectivity R as a function of wavelength $\lambda$. The four specific gratings shown are denoted G63B-1, G63B-1*, G63B-2 and G63B-2*.

The success in producing long gratings of this quality has proven that the coherency of the grating process can be maintained for the greatly increased grating lengths (e.g. 63 chip and above) needed to provide codes with a sufficient number of OCDMA chips to support a practical number of users in an OCDMA system (not just two users as for the shorter 7-bit codes).

It has also been possible to make a more sensible assessment of the achievable minimum levels of code cross-correlation, and to assess the system penalties associated with multi-user operation.

Section III: Experimental Results

A. Optical Code Generation

In order to assess the quality of the individual gratings a series of code generation experiments were performed and both the temporal and spectral characteristics of pulse forms generated on reflection from the individual code gratings were examined.

FIGS. 10A and 10B plot the temporal response of the amplitude modulated unipolar grating M7U-1. FIG. 10A is an auto-correlation plot taken with a SHG autocorrelator and plots the SHG intensity I in arbitrary units against time. FIG. 10B plots the corresponding optical spectra as power P against wavelength $\lambda$.

FIGS. 10C and 10D are corresponding plots for the phase modulated bipolar grating M7B-1.

For both gratings, the measured autocorrelations and spectral forms are found to be in excellent agreement with the theoretical predictions within the resolution limits of the respective measurements confirming the formation of the correct code patterns and the desired chip duration of 6.4 ps.

Figure 11A:
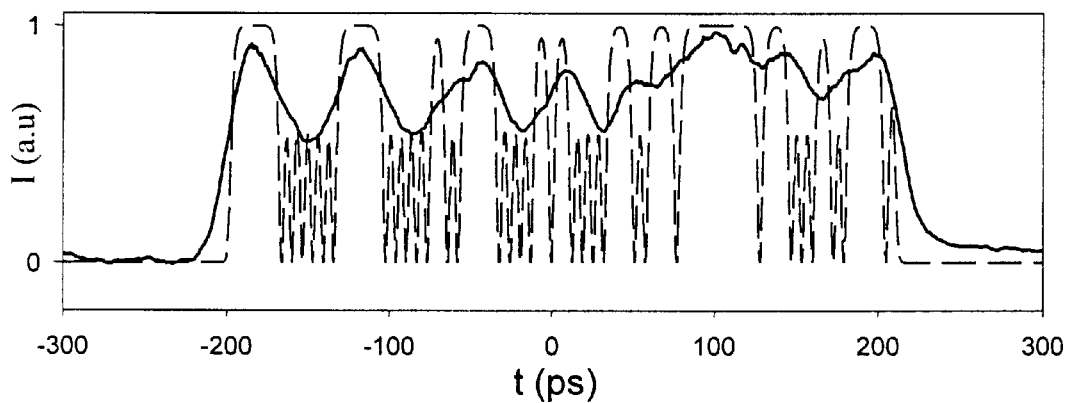
FIG. 11A shows traces of the encoded waveforms for the grating G63B-1 for 2.5 ps soliton input pulses (solid lines: experimental measurements, dashed lines: theoretical plots). The detection bandwidth of the experimental measurement (~20 GHz) was not taken into account for the theoretical calculation.
Figure 11B:
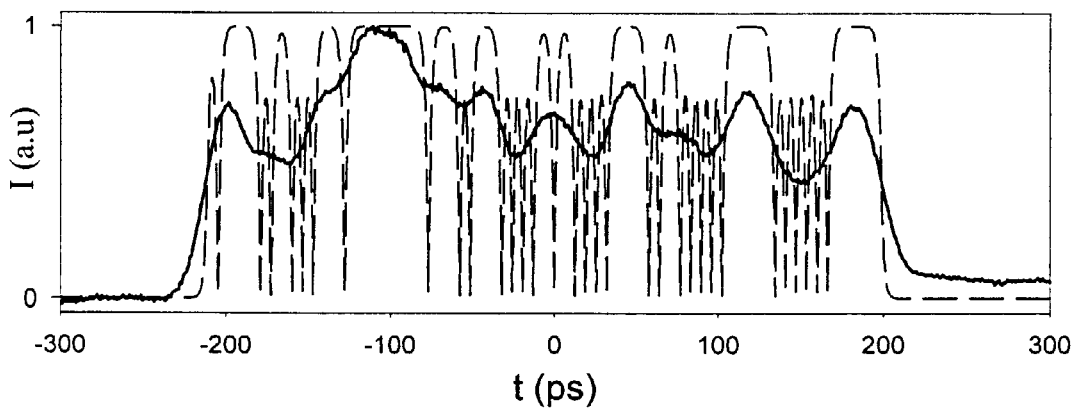
FIG. 11B corresponds to FIG. 11A, but is for the grating G63B-1*.

FIGS. 11A and 11B plot the equivalent temporal domain measurements for the longer gratings G63B-1 and G63B-1* respectively. The plots are of intensity I in arbitrary units against time. In this instance, due to the use of longer code sequences direct electronic measurements are of value since despite the 20 GHz bandwidth limitation, one can still discern features on the waveform associated with the chip structure of the individual codes. Good qualitative agreement between experiment and theory is evident. From the plots it can readily be resolved that the impulse response of G63B-1* is close to the time reversed response of G63B-1 as required for good matched filter operation. Importantly, these experiments show that it is possible to maintain good coherence within the gratings embodying the invention along lengths in excess of 40 mm, which is vital for real applications.

B. Code Recognition

Having established the high quality of our individual coding and decoding gratings their self-code recognition properties were then studied.

Figure 12A:
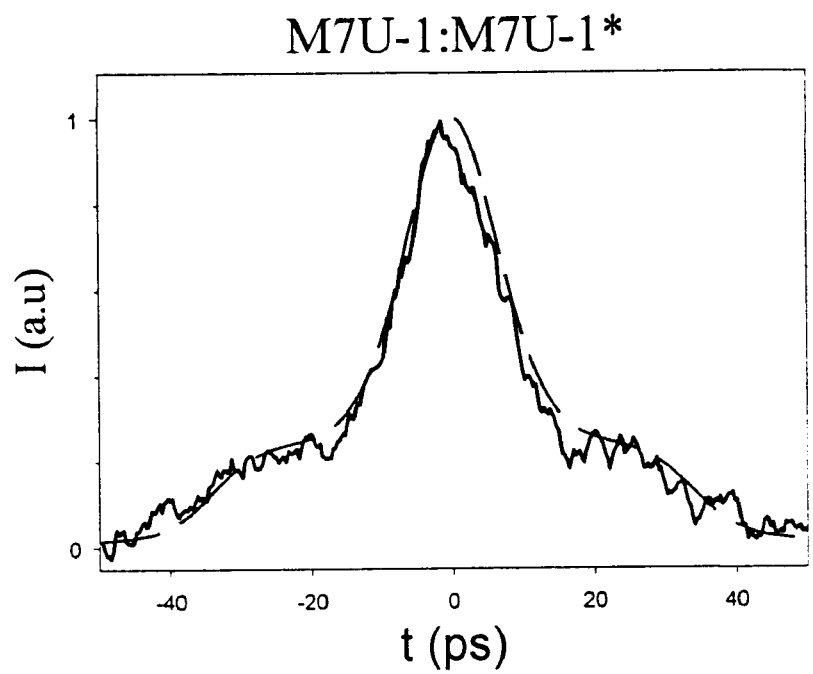
FIG. 12A plots second harmonic generation (SHG) intensity I autocorrelation traces of the signal after the code:decode process for 2.5 ps soliton input pulses for the grating combination M7U-1:M7U-1* (solid lines: experimental measurements, dashed lines: theoretical plots).

FIG. 12A compares the SHG autocorrelations of the code recognition signature of the 7-bit unipolar gratings M7U-1 and M7U-1* with theoretical predictions.

Figure 12B:
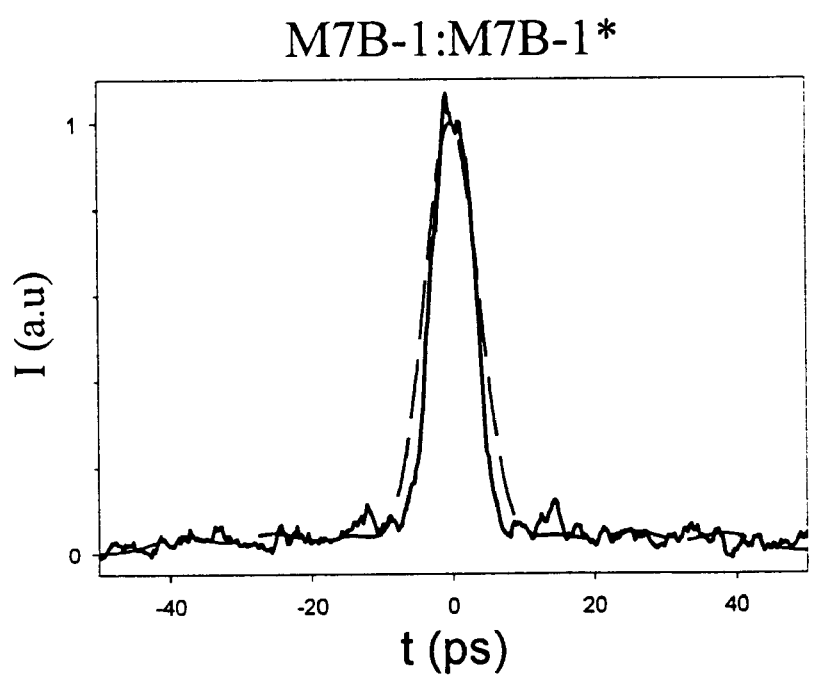
FIG. 12B corresponds to FIG. 12A, but is for the grating combination M7B-1:M7B-1*.

FIG. 12B is a similar plot comparing the SHG autocorrelations of the code recognition signature of the 7-bit bipolar gratings M7B-1 and M7B-1* with theoretical predictions.

In addition, the performance of the unipolar gratings can be compared with that of the bipolar gratings by comparing FIG. 12A with FIG. 12B.

Close to the predicted theoretical performance is achieved showing that the benefits of using the bipolar form of coding are achieved in practice, in line with the predictions made by the theory developed above in Section I. At least some of these benefits can be attributed to interferometric cancellation of the correlation peak background. In this case an extremely well defined code recognition peak of ~6.4 ps pulse width is obtained.

Figure 13A:
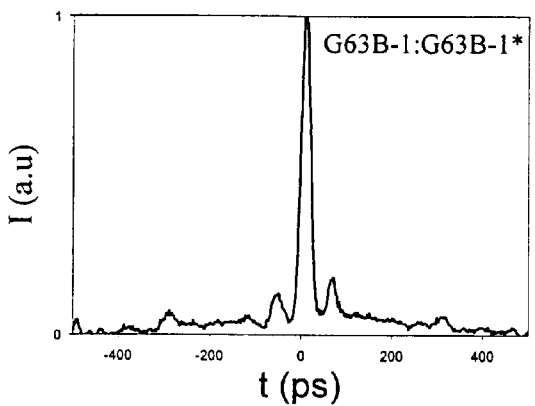
FIG. 13A is a trace of the signal after the code:decode process for 2.5 ps soliton input pulses for the grating combination G63B-1:G63B-1*. The detection bandwidth was 20 GHz.
Figure 13B:
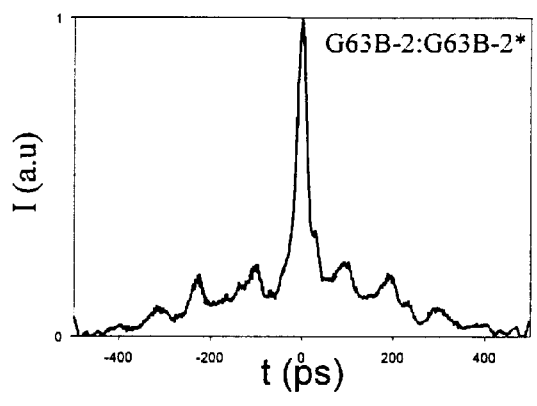
FIG. 13B corresponds to FIG. 13A, but is for the grating combination G63B-2:G63B-2*.

FIGS. 13A and 13B summarize the results of the equivalent temporal measurements made with the electronic detection system for the 63-bit code grating pairs G63B-1:G63B-1* and G63B-2:G63B-2*, where the clarity of the autocorrelation is, as theoretically predicted, even more distinct due to the larger number of chips within the code. The plots are of intensity I in arbitrary units against time t. The height of the autocorrelation spike is predicted to increase as $N^2$ where N is the code length.

Figure 13C:
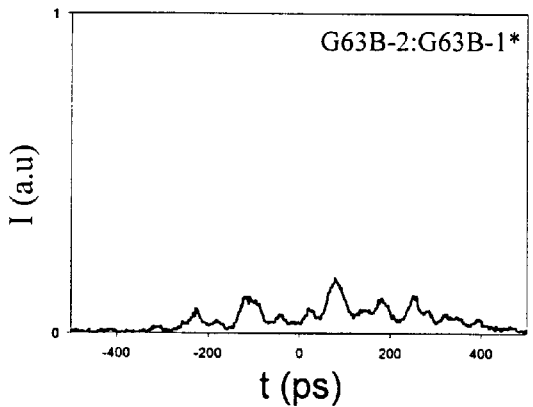
FIG. 13C corresponds to FIG. 13A, but is for the grating combination G63B-2:G63B-1*.

FIG. 13C plots the results of the coding:decoding process for two different Gold codes, namely G63B-1:G63B-2* to show the ability of the system to discriminate out unwanted signal components. The plot is of intensity I in arbitrary units against time t. As can be seen no distinct correlation spike is observed as should be the case for two different Gold codes.

Figure 13D:
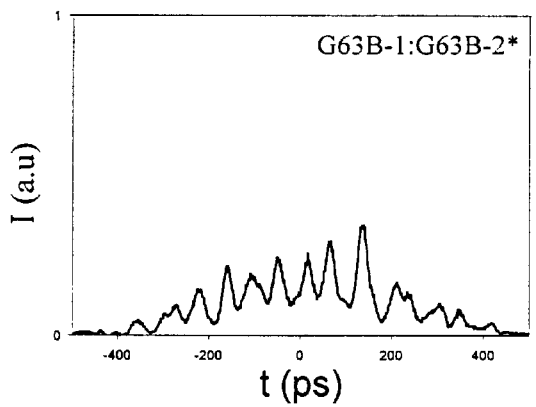
FIG. 13D corresponds to FIG. 13A, but is for the grating combination G63B-1:G63B-2*.

FIG. 13D shows similar results that were obtained for the G63B-2:G63B-1* case. The plot is of intensity I in arbitrary units against time t.

Figure 14A:
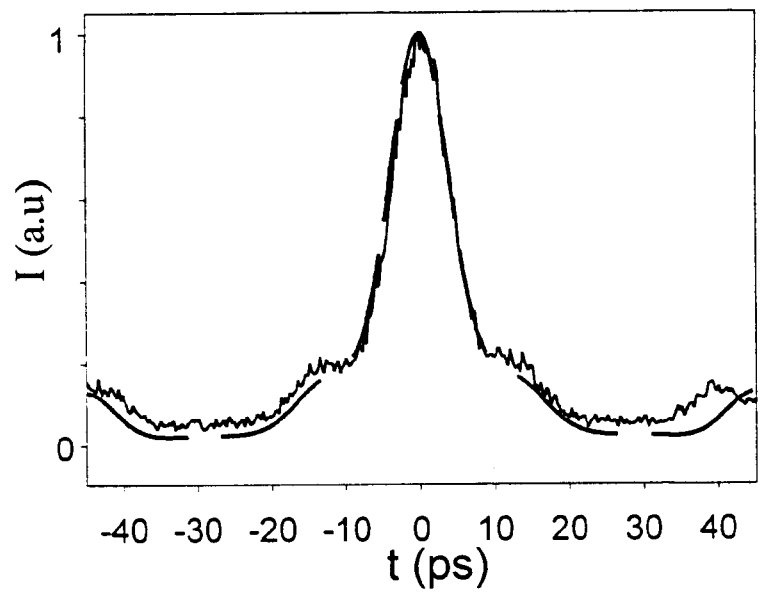
FIG. 14A plots second harmonic generation (SHG) intensity I autocorrelation traces of the signals after code:decode process for 2.5 ps soliton input pulses for the 63-bit grating combination G63B-1:G63B-1* (solid lines: experimental measurements, dashed lines: theoretical plots).
Figure 14B:
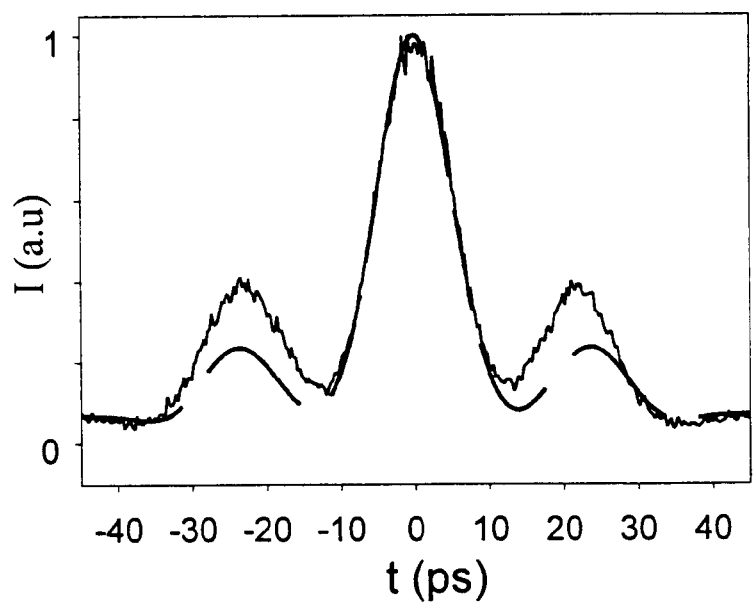
FIG. 14B corresponds to FIG. 14A, but is for the 63-bit grating combination G63B-2:G63B-2*.

FIGS. 14A and 14B show the SHG autocorrelations of the code recognition pulses for G63B-1:G63B-1* and G63B-2:G63B-2* plotted against theoretical calculations. The plots are of SHG intensity I in arbitrary units against time t. Again, close to theoretical performance can be seen with an SHG autocorrelation pulse width of ~12 ps (real optical pulse width ~6.5 ps) obtained for both cases. It is noted that it was only possible to SHG autocorrelate over a restricted section of the pattern recognition signature in the experiments due to the ~100 ps delay of the autocorrelator used.

C. System Characterization

In order to quantify the quality of our results from a system perspective, a number of encoding:decoding and transmission BER experiments were performed. The transmission line used within these experiments was composed of 25 km of standard SMF-28 grade fiber, with ~0.2 dB/km loss. The high dispersion of this fiber (~20 ps/nm/km) was compensated for using a chirped fiber grating of opposite and nominally equal dispersion at the system operating wavelength of 1557.5 nm with a full bandwidth of 5 nm.

Figure 15:
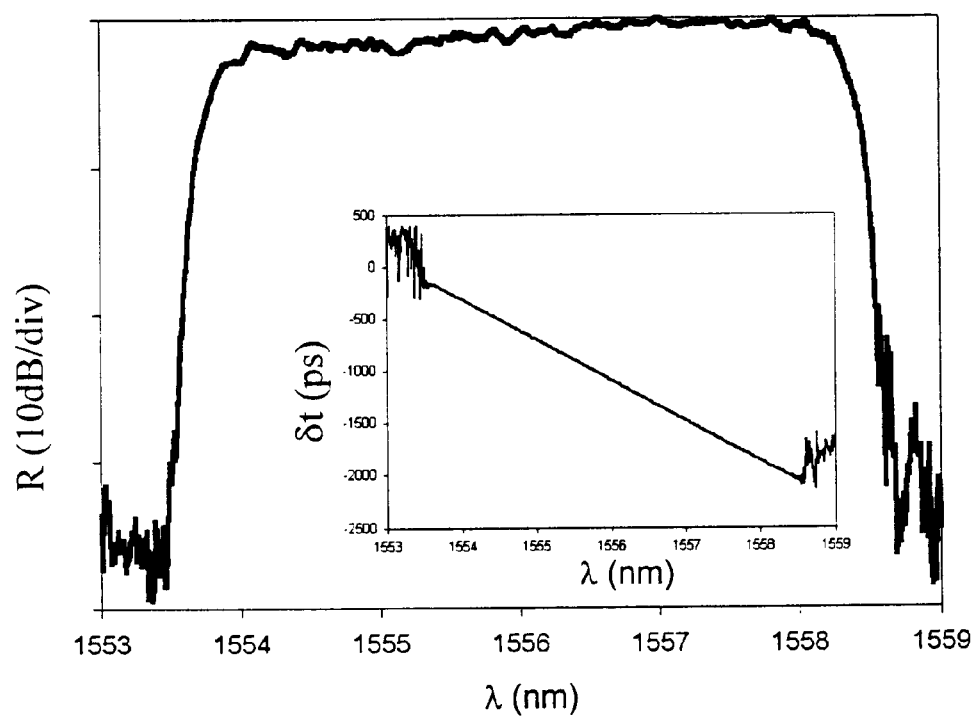
FIG. 15 shows reflectivity R as a function of wavelength $\lambda$ of a grating used for dispersion compensation in the experiments. A time delay diagram for the same grating is shown in the inset.

FIG. 15 is a plot of the dispersion compensating grating response in terms of reflectivity R against wavelength $\lambda$. The time delay $\Delta t$ as a function of wavelength $\lambda$ is shown inset. As mentioned previously the dispersion compensating grating was also fabricated using the same technique and with the same phase mask used to fabricate the coding/decoding SSFBGs.

Figure 16:
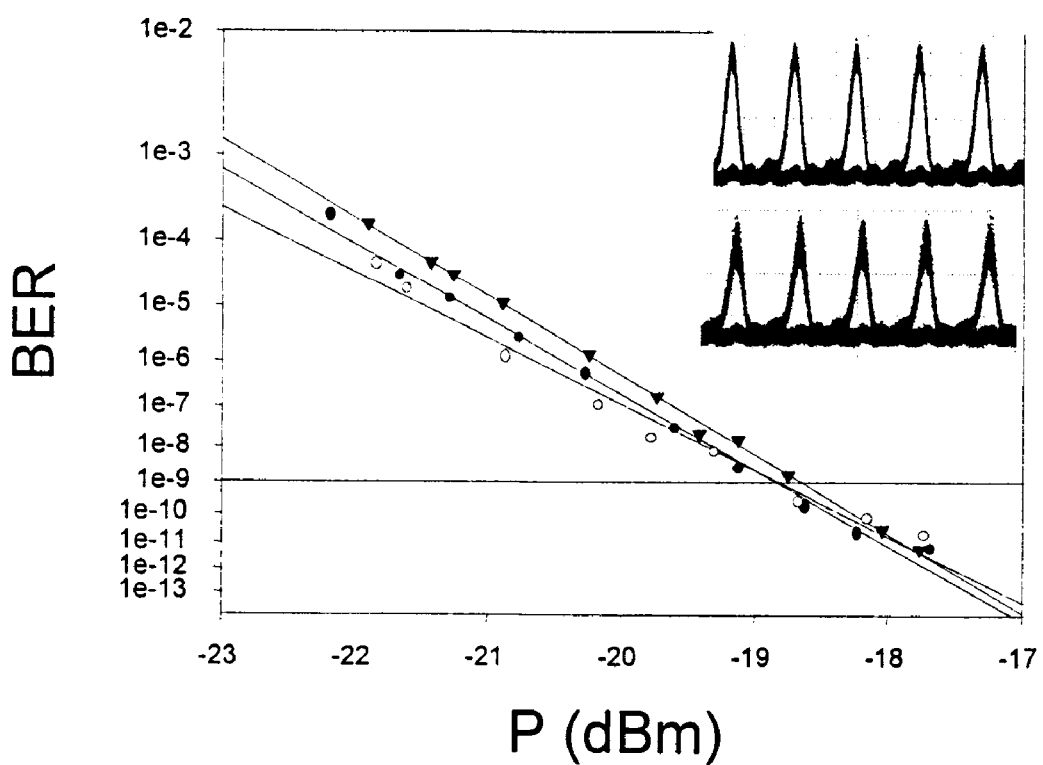
FIG. 16 shows curves for the M7B-1:M7B-1* combination plotting bit error rate BER against received power P (open circles: laser back-to-back, closed circles: decoded signal without transmission, triangles: decoded signal after transmission). Inset shows eye diagrams of the decoded signals without (upper trace) and with transmission (lower trace). The data rate was 10 Gbit/s.

FIG. 16 plots, in terms of bit error rate (BER) against received power P, the results of 10 Gbit/s encoding:decoding experiments using the grating pair M7B-1:M7B-1*. Error free performance and clear eye-diagrams are obtained for the coding:decoding process both with and without the additional 25 km transmission distance. No discernible power penalty is observed relative to the back-to-back transmitter measurements. Note that the width of the pattern recognition trace is two times the total code length i.e. 89.6 ps, just less than the bit period of 100 ps.

Figure 17:
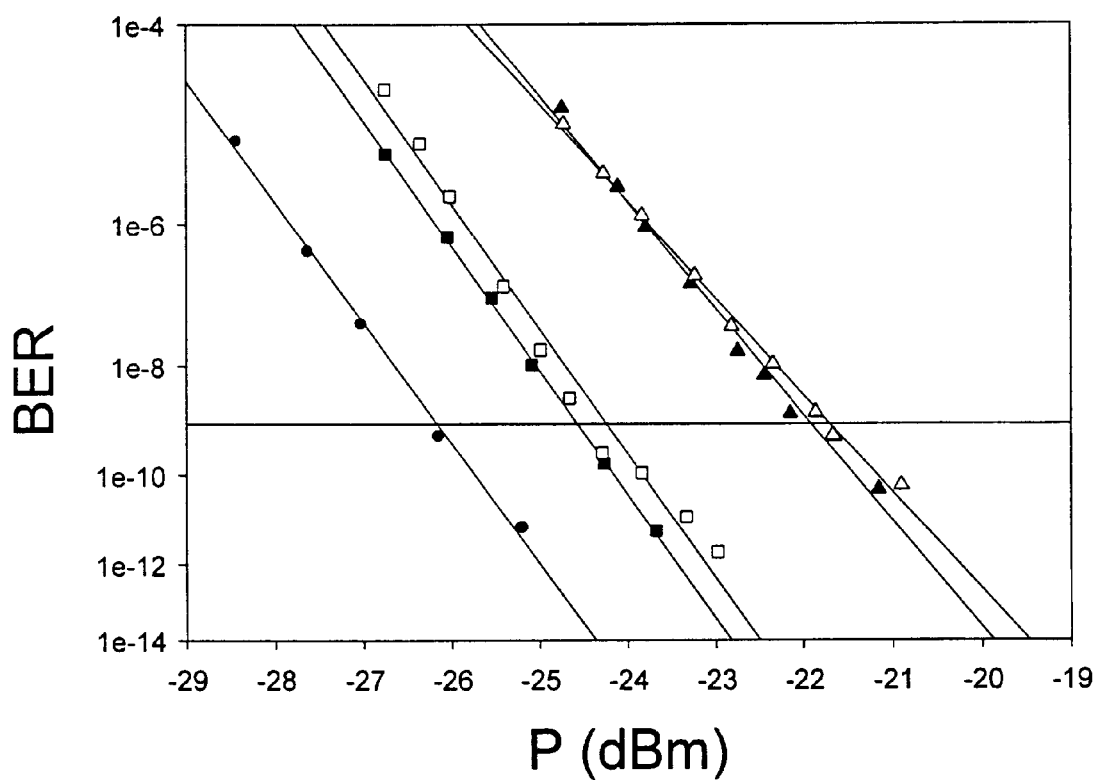
FIG. 17 shows curves for the G63B-1:G63B-1* combination plotting bit error rate BER against received power P (closed circles: laser back-to-back, closed squares: no transmission, open squares: after transmission, closed triangles: with $2^{nd}$ channel present and no transmission, open triangles: with $2^{nd}$ channel present and transmission). The data rate was 1.25 Gbit/s.

FIG. 17 plots, in terms of bit error rate (BER) against received power P, BER curves for the G63B-1:G63B-1*grating pair encode:decode process along with results for the associated 25 km transmission. These measurements were made at a bit rate of 1.25 Gbit/s to ensure no temporal overlap of adjacent decoded correlation pulses. Error free performance is obtained for the code:decode process both with and without transmission and with minimal power penalty between both cases, there is however a slight power penalty of ~1.5 dB between these measurements relative to the laser back-to-back measurement. Also included in the figure is a curve showing the results of experiments in which code sequences were simultaneously generated using gratings G63B-1 and G63B-2 and then combined together before decoding the resulting signal with G63B-1*. The power in each individual channel at the receiver was identical. This measurement was also performed with the 25 km transmission inserted between the encoding and decoding steps. We could thus begin to investigate the impact of interchannel crosstalk although it should be appreciated that the codes were generated with pulses derived from the same source and that this leads to additional noise due to the coherent interference between the code-sequences.

In order to minimize the impact of this effect, the relative time delay between channels was carefully set to be such that the ~400 ps code sequences incident to the decoder grating did not overlap significantly in time. Note however that the correlation returns from the decoder grating, which have twice the length of the incident codes, do overlap in the tails which results in a degree of coherent interference in the pulse tails. Despite this we obtained error-free performance with minimal power penalty both with and without transmission. The apparent noise penalty of ~3 dB observed when comparing G63B-1:G63B-1*cases the with 2-channel case (G63B-1 and G63B-2:G63B-1*) results primarily from the increased average power due to the addition of the second coded channel, thereby demonstrating the excellent code discrimination achieved using our gratings. A more stringent test of the cross-talk performance would obviously require the use of an independent pulse generator to generate each of the independent pulse codes.

Section IV: Grating Fabrication

The superstructure Bragg gratings used for the encoding and decoding in these experiments are made using a period-by-period Bragg grating manufacturing technique. By placing a photosensitive fiber in an interference pattern consisting of regions of high and low intensity the high intensity regions will cause a positive index change only and thus a grating will be formed with the grating period given by the periodicity of the interference pattern. The fiber-waveguide then is translated continuously at a constant velocity along the axis perpendicular to the interference fringes with sub-nanometer precision provided by an interferometer. To avoid obliterating the grating structure, the writing beam (interference pattern) is digitally modulated on and off at least once within one grating period. The on/off position then will determine the phase-coherence between adjacent grating periods. The actual on/off positions are determined by the feedback from the interferometer. Therefore, the principle of this technique for example allows for very accurate phase-shift positioning and magnitude of the phase-shifts between adjacent chips in the grating because each grating period is placed with sub-nanometer precision.

In the case of the uni-polar Bragg gratings, the chips consist of either a region of uniform grating of the same duration as the chip-duration or a region of un-modulated refractive index of the same duration as the chip-duration, i.e. no Bragg grating. The individual chips all are in phase (i.e. are separated by an integer number of 2 in phase terms, that is an integer number of grating-periods in spatial terms) and all have the same Bragg wavelength.

In the case of the bi-polar Bragg gratings in the illustrated case, the chips all consist of a region of uniform Bragg grating of the same duration as the chip-duration and with the same Bragg wavelength. The individual chips are separated by a phase-shift of either 0 (equivalent to no phase-shift) or. A phase-shift corresponds to a discrete step in the position of adjacent grating periods of half the period of the interference pattern at the position of the start of the adjacent chip.

In the event of a Bragg grating with both an amplitude and phase superstructure profiles, the fabrication becomes more complex. A smooth amplitude profile relates to a variation in the refractive-index modulation depth of the grating in a non-discrete way. A smooth amplitude profile is achieved by de-phasing adjacent grating periods with respect to each other to obtain partial coherence at the Bragg wavelength. More details of the relevant techniques can be found in reference [19].

Smooth amplitude profiles can be imposed either on the overall grating structure or on the individual chips.

An apparatus for implementing the OCDMA grating coder:decoder fabrication is now described with reference to FIGS. 18 to 20.

Figure 18:
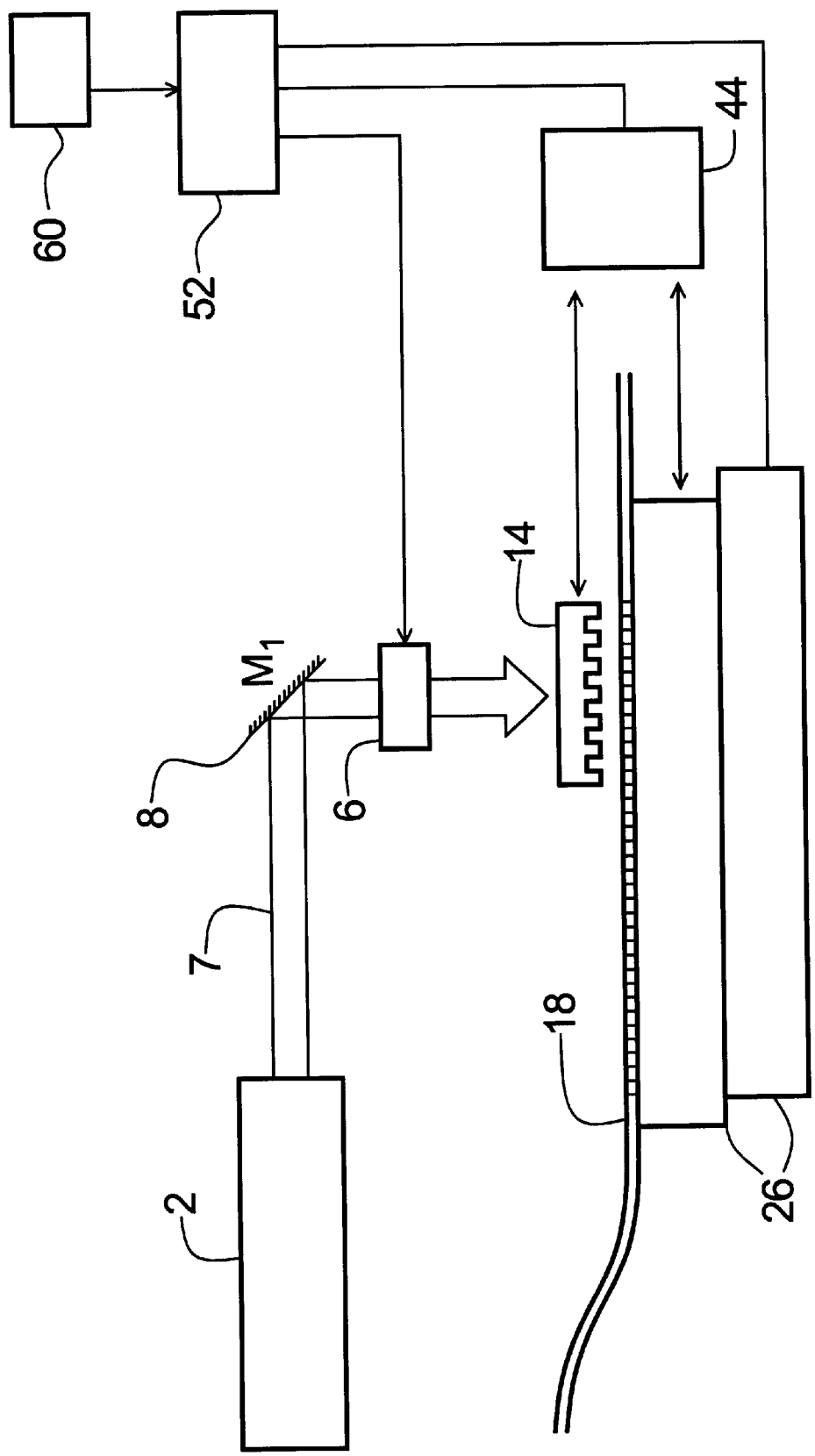
FIG. 18 shows an apparatus for fabricating coder:decoder gratings according to embodiments of the invention.

FIG. 18 is a basic schematic diagram of the grating fabrication apparatus. A laser 2 supplies a beam 7 to a phase mask 14 via a mirror (M1) 8 and an acousto-optic modulator (AOM) 6 to expose a photosensitive waveguide in the form of an optical fiber 18. The fiber 18 is mounted on a translation stage 26 which is used to move the fiber 18 relative to the phase mask 14 under control of a control computer 60 control being implemented through a decision logic unit 52 and an interferometer 44 that is used to provide position measurements from the moving part of the translation stage.

Figure 19:
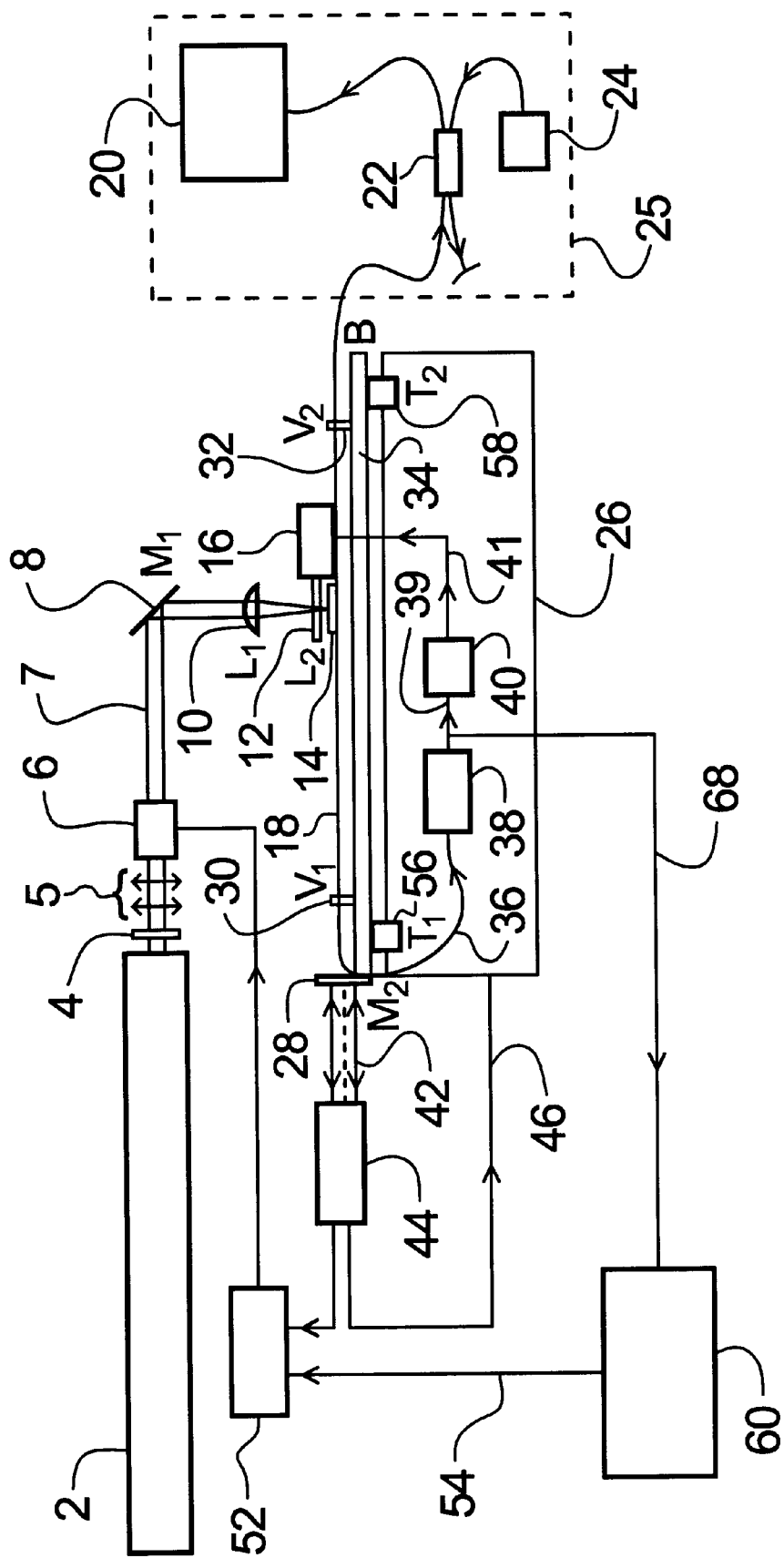
FIG. 19 shows the apparatus of FIG. 18 in more detail.

FIG. 19 is a more detailed diagram of the grating fabrication apparatus of FIG. 18. The interferometer is shown arranged to the left rather than the right of the translation stage, otherwise the two figures are directly relatable, with like reference numerals being used for corresponding components. As in FIG. 18, FIG. 19 illustrates a laser 2 supplying a beam 7 to a phase mask 14 to expose a photosensitive waveguide in the form of an optical fiber 18. The laser used is a continuous wave (CW) laser producing a beam having a power of up to 100 mW at a lasing wavelength of 244 nm, i.e. in the ultra-violet (UV) region. Placed in the beam path of the laser 2 there are in turn an interlock 4 and an acousto-optic modulator (AOM) 6. The laser beam is in a polarized state as indicated by arrows 5. After traversing these components, the beam 7 is deflected through 90 degrees by a mirror (M1) 8, through a focusing lens (L1) 10, a further lens (L2) 12 and the phase mask 14, thereby to image a periodic intensity pattern onto a section of the optical fiber 18. The phase mask 14 is positioned remote from the optical fiber 18, rather than in contact. A piezo-electric positioning device (PZT) 16 is provided for adjusting the position of the lens 12 to ensure good alignment between the beam 7 and the optical fiber 18. The position adjustment may be in the form of a dither (i.e. periodic spatial oscillation) having a frequency selected to be small in comparison to the rate at which fringes traverse the exposure region (which is typically in the order of kHz). A value of 20 Hz is typical for the dither frequency.

The optical fiber 18 is securely held on a bar (B) 34 in first and second V-grooves (V1 & V2) 30 and 32. At one end of the bar 34 there is mounted a mirror (M2) 28 which defines a measurement arm 42 of an interferometer 44 that is used to provide absolute position measurements of the bar 34 which is movably mounted on a linear translation stage 26. Translation mounts (T1 & T2) 56 and 58 mount the bar 34 to the translation stage 26. The translation stage used provided a travel of about 105 cm (42 inches). The interferometer 44 used was a double-pass He—Ne interferometer. A position feed-back connection 46 provides a feed-back signal from the interferometer 44 to the linear translation stage 26 to ensure absolute positioning accuracy. A further connection 48 connects an output of the interferometer 44 to a decision logic unit 52. The decision logic unit 52 receives a further input from a connection 54 which links the decision logic unit 52 to an output of a control computer (PC) 60. The control computer 60 stores a set of pre-calculated beam modulation positions which define the structure of the grating to be fabricated. The set of beam modulation positions may define an aperiodic structure (e.g. a chirped grating) or a periodic structure (e.g. a grating of a single period). The connection 54 relays a signal from the control computer 60 that conveys calculated beam modulation positions to the decision logic 52. The decision logic 52 controls the AOM 6 through a connection 50 and based on the inputs from connections 48 and 54. Namely, the state of the AOM 6 is switched by the decision logic 52 when the measured position received from the interferometer 48 corresponds to the modulation position received from the control computer 60.

One end of the fiber 18 is connected to some general diagnostics 25 comprising an optical spectrum analyzer (OSA) 20, a 50:50 beam splitter 22 and a broadband optical source 24 which are connected as shown in FIG. 15.

The other end 36 of the fiber 18 is connected to a photo-detector 38 for measuring fluorescence induced in the fiber 18 by the light beam 7. In a specific example, the detector 38 measures fluorescence from an emission at 400 nm. The detector 38 has an output connected via connection 39 to a tracking circuit for conveying a fluorescence signal to the tracking circuit 40. Responsive to the fluorescence signal, the tracking circuit 40 outputs a dither control signal through a connection 41 to the PZT 16 that provides the above-described dithering.

The apparatus is further provided with an additional control connection 68 which is used to supply the fluorescence signal from the detector 38 to the control computer 60. This can be used to control (with or without feedback) registry between the phase mask and portions of the grating already written.

Figure 20:
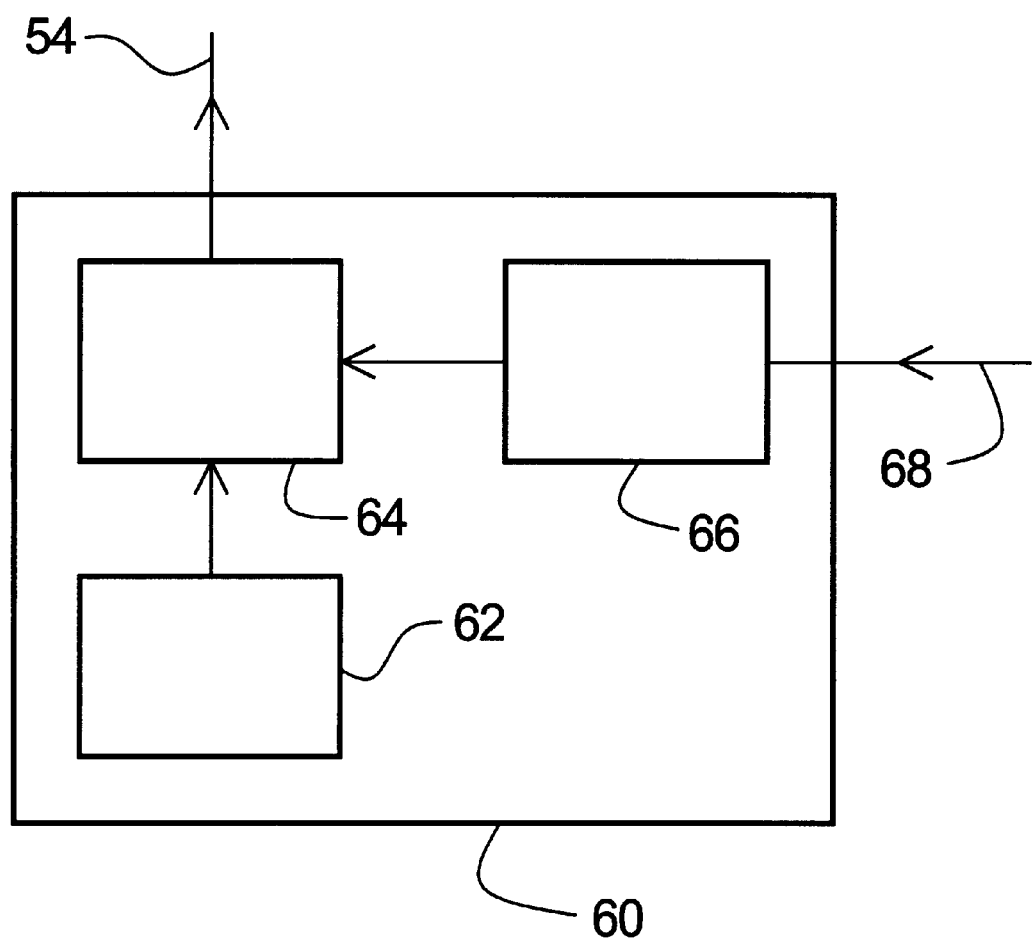
FIG. 20 shows internal structure of the controller of the apparatus of FIGS. 18 and 19.

FIG. 20 shows internal structure of the control computer 60. The data set of pre-calculated beam modulation positions defining the structure of the grating to be fabricated are stored in storage device 62. This data set is made up of data subsets for the individual grating sections, corresponding to the individual OCDMA chips. A driver unit 64 is connected to transmit drive signals on connection 54 to the decision logic unit 52 which in turn controls the exposures via the AOM 6. The driver unit is thus arranged to generate exposures of the interference pattern onto the photosensitive material at positions defined by the linear translation stage 26. A feedback control unit 66 is arranged to receive the fluorescence signal so that registry with existing portions of the grating can be maintained. This feedback facility is optional. In other words feedback control unit 66 and connection 68 could be dispensed with. In addition, it will be understood that all the components of the apparatus relating to measurement of fluorescence only have functions as either part of such a feedback control, non-feedback control, or as diagnostics. Accordingly, these components could all be dispensed with in a simpler alternative embodiment.

The control computer 60 is operable to write the desired superstructure profile for an OCDMA coder or decoder grating based on NRZ modulation by first generating a first set of N exposures, where N is an integer equal to or greater than 2, separated by an integer multiple of the fringe period, in order to write the first chip.

To write the next chip (assuming that there is a transition in the code data between the first and second chips) a second set of N exposures is made, also separated by the integer multiple of the fringe period and offset from the first set of N exposures by a distance equal to a predetermined fraction of the fringe period (e.g. ½ for a pi phase shift). If there is no transition in the code data between the first and second chips, the exposures carry on continuously from the first chip exposures with no offset.

The profile for subsequent chips is then written in the same way.

The procedure for writing OCDMA coder or decoder gratings with RZ modulation is the same between chips where there is a transition in the code data, but different in the case that there is no transition in the code data. More specifically, in the case of a RZ-type modulation, i.e. a chip-profile that alters from full contrast (1) (uniform Bragg grating) to no-contrast (0) (no Bragg grating) once within the chip-duration, the chip duration would then be the sum of the durations of the (1) and (0) parts. Typically, the duty-cycle of this RZ modulation then will be given by the duration of the (1)-part to the total chip duration. Phase-shifts in either of the cases described above would be implemented in this case in a similar manner.

Section V: Optical Packet Switching

Although the above-described embodiments have focused on the use of SSFBG technology for OCDMA applications, it is to be appreciated that the technology should also find use in a whole range of other network and transport applications in which optical pattern/code generation and recognition are required. The technology is particularly relevant to packet-switched network applications in which individual 'packets' of data are generally preceded by an optical header that defines the key routing information associated with the data payload. SSFBGs can be used to both generate and recognize these packet headers. Packet based systems can be designed to run under a variety of protocols and formats including both Internet Protocol (IP), and Asynchronous Transfer Mode (ATM) protocol. The technology is also capable of supporting an admixture of protocols on one network. Moreover, due to the inherent wavelength selectivity of gratings, the technology will allow significant WDM and DWDM multiplexing of channels.

Once generated, a header recognition signature can be used to effect onward processing, e.g. routing, of the optical data.

Figure 21:
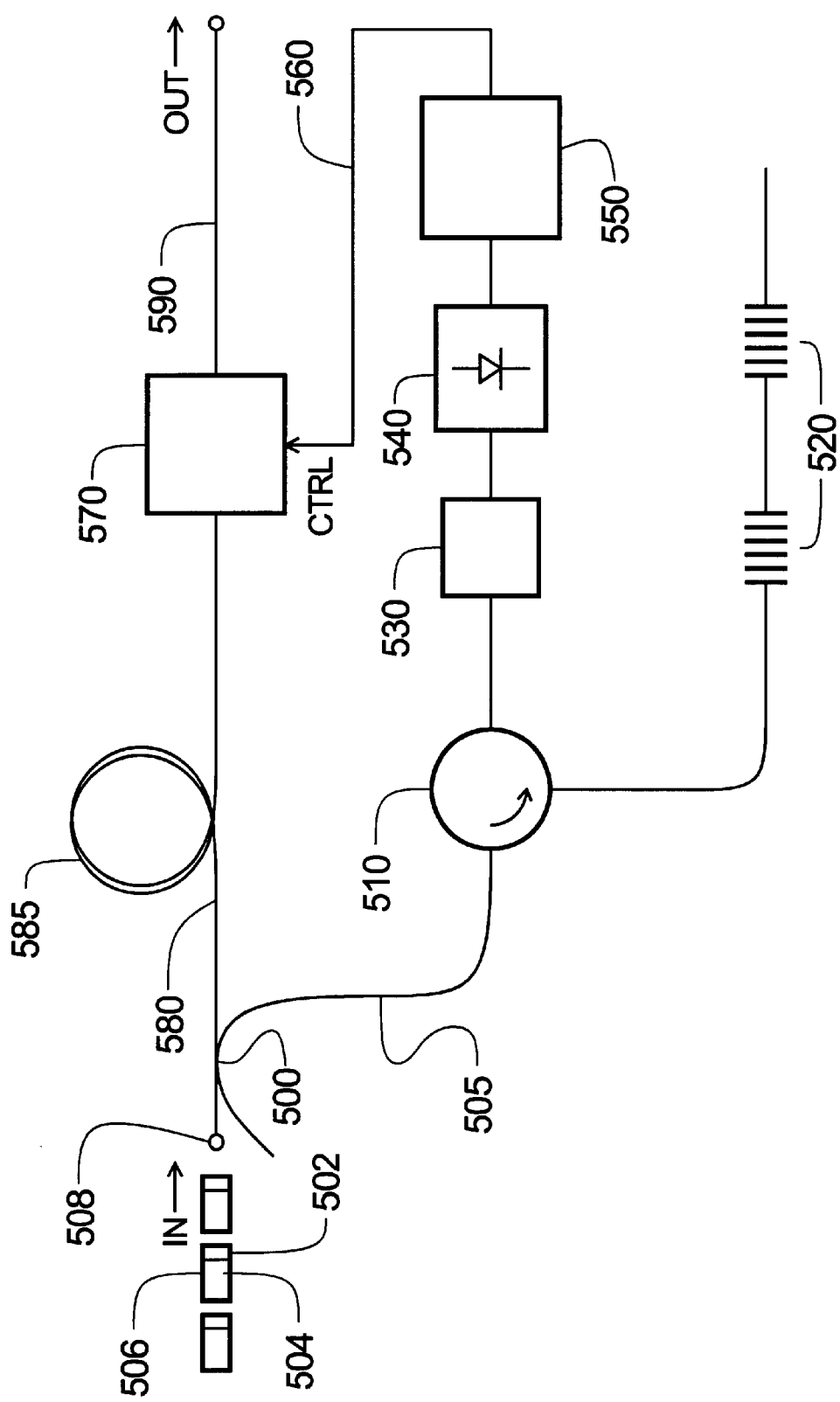
FIG. 21 shows an optical switching node for a packet-switched optical communication system according to a further embodiment of the invention.

FIG. 21 shows as one example an optical switching node for IP data for use in a packet switched network. An incoming data stream made up of a series of packets 506 is received at an input 508 of the routing node. Each packet 506 comprises a header 502, that defines the code address, and a subsequent data payload 504, separated by a short (guard-) time from the header address. The signal enters the routing node where it is split into two by a splitter 500, for example a 3 dB fiber coupler.

In one path 580 the signal proceeds through an optical delay line 585 to an input of an optical switch (or router, filter or modulator) 570.

In the other path 505 the signal is supplied through an optical circulator 510 to one or more decoder gratings 520 of the kind described in relation to the previous embodiment. The reflected signal is then routed onwards in the signal path by the circulator 510. If multiple decoder gratings 520 are provided, they may be arranged in series as shown or parallel. Each decoder grating is designed to provide a matched filtered response to a particular optical header 502. When correct matched filtering is obtained, (i.e. the incoming header matches one of the decoder gratings), a relatively intense autocorrelation signature is generated by the decoder grating which is then supplied to an optoelectronic converter 540, e.g. a fast-response photodetector, through a non-linear element 530 for pulse shaping.

The optoelectronic converter 540 is connected to an electronic decision circuit 550 which has an electrical output line 560 connected to a control input of the optical switch 570 for triggering it. The electrical control signal thereby gates the switch 570 for sufficient time to allow passage of the original data packet (and generally, but not necessarily, also the header) into the output line 590. The delay line 585 on the input arm 580 of the switch may be actively controlled (e.g. by stretching a fiber spool with a piezoelectric actuator) to ensure that the opening of the switch 570 occurs at the correct time relative to the incoming data signal (i.e. it can be used to accommodate the various time-lags within the system).

This is just one such example of a useful device for packet switched network applications that can be constructed from SSFBG components. There are many other such examples that one can envisage. For example an optical routing node where the incoming signal is routed to one of a plurality of output lines depending on the header.

The optical packet switching system may operate with asynchronous transmitters, or a combination of synchronous and asynchronous transmitters and receivers.

Section VI: Combined Phase and Amplitude Modulation

Figure 22:
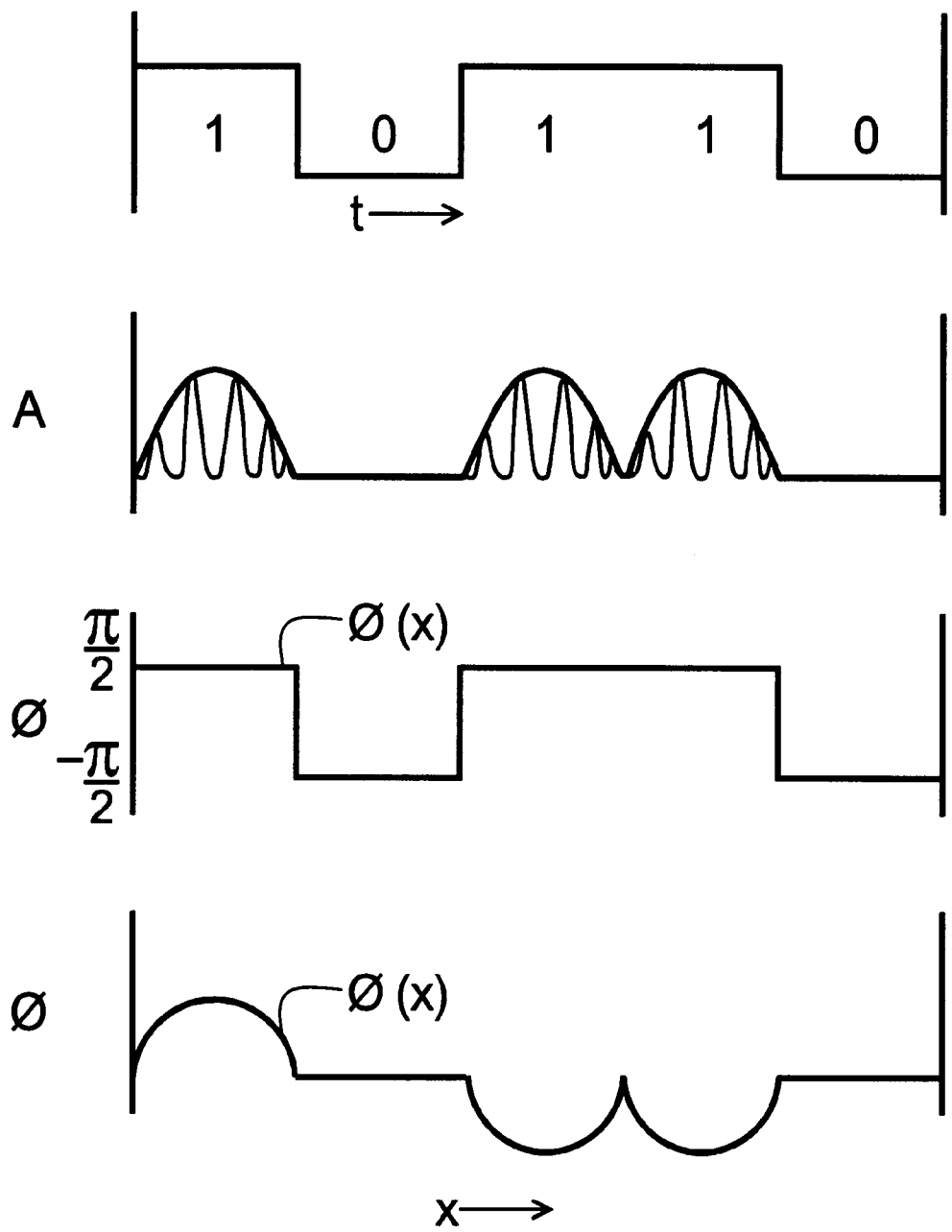
FIG. 22 illustrates a schematic example of a 5-bit code implemented by a combination of amplitude and phase modulation, showing temporal code (uppermost trace) and the corresponding refractive index modulation profile along the SSFBG structure (upper middle trace) in terms of refractive index modulation A against position along the grating x, as well as phase plots along the grating (lower traces).

FIG. 22 illustrates a schematic example of a 5-bit code implemented by a combination of amplitude and phase modulation, showing temporal code (uppermost trace) and the corresponding refractive index modulation profile along the SSFBG structure (upper middle trace) in terms of refractive index modulation A against position along the grating x, as well as phase plots along the grating (lower traces). As can be seen the chip code is implemented by imposing an amplitude envelope in the refractive index modulation of the "1" chips in combination with discrete pi phase shifts at the chip boundary (lower middle trace) or a gradual phase evolution corresponding to the amplitude envelope (lowest trace). This lowest trace is a specific example showing a general point that the phase discontinuity at the chip boundary need not necessarily be an abrupt single jump. Many other combined amplitude and modulation coding schemes may be used.

Section VII: Quadrupolar Coding

Figure 23A:
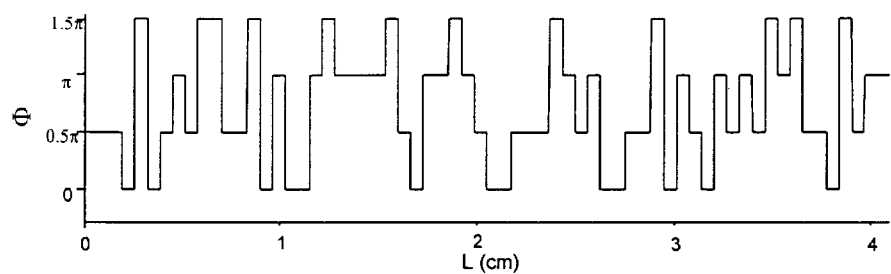
FIG. 23A shows the superstructure profile of a 64-chip quadrupole QPSK grating C1.
Figure 23B:
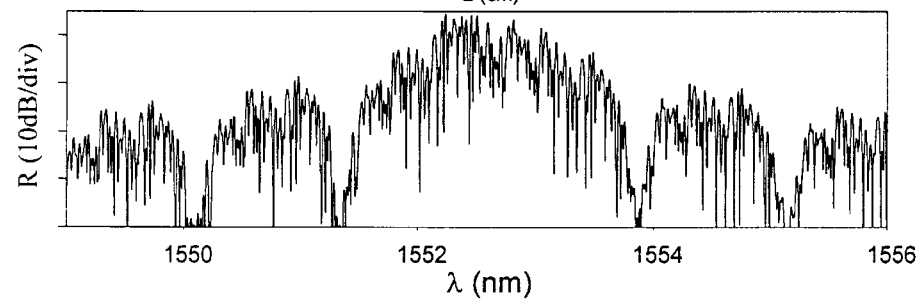
FIG. 23B shows the calculated reflectivity spectrum for the quadrupolar grating C1.
Figure 23C:
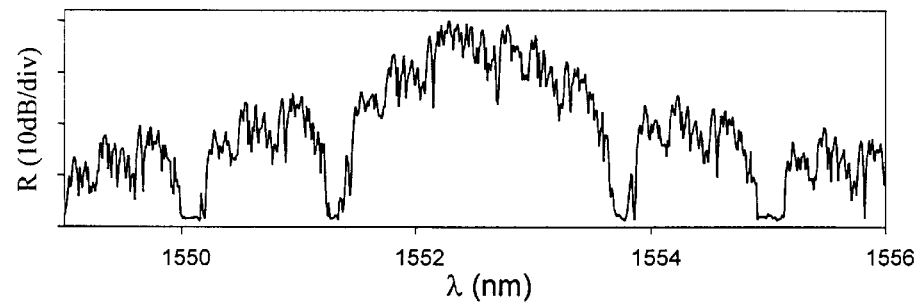
FIG. 23C shows an experimental reflectivity spectrum for the quadrupolar grating C1.

FIGS. 23A–C relate to a quadrupolar grating fabricated using the method described above using pure phase modulation of pi/2 increments and NRZ format.

FIG. 23A shows the superstructure profile of the grating, which is a 64-chip quadrupole QPSK grating, labeled C1. As can be seen each level of coding is implemented with pi/2 increments of phase $\phi$. The total grating length 1 is approximately 4 cm.

FIG. 23B shows the theoretical, i.e. calculated, reflectivity spectrum for the quadrupolar grating C1, where R is reflectivity and $\lambda$ wavelength.

FIG. 23C is a corresponding plot showing an experimental reflectivity spectrum for a fabricated quadrupolar grating C1 reproducing the superstructure profile of FIG. 23A. As can be seen the fabricated grating correlates quite well with the theoretical ideal.

It will be understood that still higher levels of coding may also be produced in further examples, for example 8 or 16 level codes. Moreover, these need not necessarily be implemented purely with phase modulation, but may include a combination of phase and amplitude modulation.

Section VIII: Conclusions

In conclusion a comparative study of unipolar and novel bipolar OCDMA transmission systems based on SSFBG technology has been performed. The benefits of the novel bipolar approach are striking. The study shows that high quality unipolar, bipolar and quadrupolar coding can be achieved, with a performance close to that theoretically predicted. A method has been described by which it has been possible to fabricate much longer OCDMA gratings (unipolar, bipolar and quadrupolar) than previously reported which is of critical importance to realizing real OCDMA transmission systems.

It has been demonstrated that SSFBG-based OCDMA is applicable to far shorter chip lengths (6.4 ps), far higher data rates (10 Gbit/s), and far longer code lengths (63 chips) than previously demonstrated. Good agreement with theory has been obtained.

A number of fundamental system measurements of the code sequences have been performed, both back-to-back and over a 25 km transmission line. The experiments show there to be little, if any, power penalty associated with the coding:decoding and transmission processes for individual codes. Moreover, error free performance has been demonstrated under multi-user operation (two simultaneous users).

The results highlight the precision and flexibility of the grating writing process and show that SSFBG technology represents a promising technology for OCDMA.

References

[1] N. Wada, K. Kitayama, "A 10 Gb/s Optical Code Division Multiplexing Using 8-Chip Optical Bipolar Code and Coherent Detection", Journal of Lightwave Technology, Vol. 17, pp. 1758–1765, 1999.

[2] H. Tsuda, H. Takenouchi, T. Ishii, K. Okamoto, T. Goh, K. Sato, A. Hirano, T. Kurokawa, C. Amano, "Spectral encoding and decoding of 10 Gbit/s femtosecond pulses using high resolution arrayed-waveguide grating", Electronics Letters, Vol. 35, pp. 1186–1187, 1999.

[3] M. E. Marhic, "Coherent Optical CDMA Networks", Journal of Lightwave Technology, Vol. 11, pp. 854–863, 1993.

[4] P. R. Pructnal, M. A. Santoro, T. R. Fan, "Spread spectrum fiber-optic local area network using optical processing", Journal of Lightwave Technology, Vol. 4, pp. 547–554, 1986.

[5] R. M. Gagliardi, A. J. Mendez, M. R. Dale, E. Park, "Fiber-optic digital video multiplexing using optical CDMA", Journal of Lightwave Technology, Vol. 11, pp. 20–26, 1993.

[6] H. P. Sardesai, C. C. Chang, A. M. Weiner, "A Femtosecond Code Division Multiple-Access Communication System Test Bed", Journal of Lightwave Technology, Vol. 16, pp. 1953–1964, 1998.

[7] T. Dennis, J. F. Young, "Optical Implementation of Bipolar Codes", IEEE Journal of Quantum Electronics", Vol. 35, pp. 287–291, 1999.

[8] H. Fathallah, L. A. Rusch, S. LaRochelle, "Passive Optical Fast Frequency-Hop CDMA Communications System", Journal of Lightwave Technology, Vol. 17, pp. 397–405, 1999.

[9] N. Wada, H. Sotobayashi, K. Kitayama, "2.5 Gbit/s time-spread/wavelength-hop optical code division multiplexing using fiber Bragg grating with supercontinuum light source", Electronics Letters, Vol. 36, pp. 815–817, 2000.

[10] A. Grunnet-Jepsen, A. E. Johnson, E. S. Maniloff, T. W. Mossberg, M. J. Munroe, J. N. Sweetser, "Demonstration of All-Fiber Sparse Lightwave CDMA based on Temporal Phase Encoding", IEEE Photonics Technology Letters, Vol. 11, pp. 1283–1285, 1999.

[11] H. Geiger, A. Fu, P. Petropoulos, M. Ibsen, D. J. Richardson, R. I. Laming, "Demonstration of a simple CDMA transmitter and receiver using sampled fiber gratings", Technical Proceeding ECOC'98, Vol. 1, pp. 337–338, 1998.

[12] A. J. Viterbi, "CDMA Principles of Spread Spectrum Communication" Addison-Wesley, 1995.

[13] M. Ibsen, M. K. Durkin, M. J. Cole, M. N. Zervas, R. I. Laming, "Recent advances in long dispersion compensating fiber Bragg gratings", IEE Publications, UK ISSN 0963–3308-ref.no. 1999/023, 1999.

[14] B. J. Eggleton, P. A. Krug, L. Poladian, F. Ouellette, "Long periodic superstructure Bragg gratings in optical fibres", Electronics Letters, Vol. 30, pp. 1620–1622, 1994.

[15] R. Gold, "Optical Binary Sequences for Spread Spectrum Multiplexing", IEEE Transaction on Information Theory, Vol. IT-B, pp.619–621, 1967.

[16] E. H. Dinan, B. Jabbari, "Spreading Codes for Direct Sequence CDMA and Wideband CDMA Cellular Networks", IEEE Communications Magazine, Vol. 36, pp. 48–54, 1998.

[17] M. Ibsen, M. K. Durkin, M. J. Cole, R. I. Laming, "Sinc-Sampled Fiber Bragg Gratings for Identical Multiple Wavelength Operation", IEEE Photonics Technology Letters, Vol. 10, pp. 842–844, 1998.

[18] WO 98/08120

[19] WO 99/22255

[20] WO 99/67668

What is claimed is:

1. A method of fabricating an optical waveguide grating for encoding or decoding an optical signal by writing a succession of grating sections into a photosensitive waveguide, each grating section representing a chip of a code signature, the method comprising:

(a) writing a first grating section into the photosensitive waveguide by repeatedly exposing an inscription beam having a periodic intensity pattern onto a first length of the waveguide and moving the inscription beam relative to the waveguide between successive exposures or groups of exposures, such that the first grating section comprises a plurality of grating lines, each of at least a majority of which is produced by multiple exposures; and (b) writing further grating sections into further lengths of waveguide, each further grating section either being in phase with, or having a predetermined phase shift relative to, the preceding grating section, depending on whether the code signature has a change in polarity between chips;

wherein the code signature comprises at least 63 chips.

2. A method according to claim 1, wherein the predetermined phase shifts are pi phase shifts.

3. A method according to claim 1, wherein the predetermined phase shifts comprise at least two different phase shifts.

4. A method according to claim 1, wherein the modulated refractive index profile has a substantially constant amplitude modulation, thereby to provide multipolar coding purely through phase modulation.

5. A method according to claim 4, wherein the multipolar coding is bipolar.

6. A method according to claim 4, wherein the multipolar coding is quadrupolar.

7. A method according to claim 1, wherein the photosensitive optical waveguide is an optical fiber.

8. A method according to claim 1, wherein the code signature is written in NRZ format with phase continuity in the refractive index modulation profile between adjoining grating sections representing adjacent chips of like polarity.

9. A method according to claim 1, wherein the code signature is written in RZ format in the refractive index modulation profile between adjacent chips of like polarity.

10. A grating for encoding or decoding optical signals, comprising a photosensitive optical waveguide with a modulated refractive index profile comprising a plurality of sections representing code chips of an code signature, characterized in that changes in polarity between code chips are implemented by pi/n phase shifts in the modulated refractive index profile, where n is a positive integer related to the level of coding, thereby to provide multipolar coding through phase modulation, wherein the code signature comprises at least 63 chips.

11. A grating according to claim 10, wherein the modulated refractive index profile has a substantially constant amplitude modulation, thereby to provide multipolar coding purely through phase modulation.

12. A grating according to claim 11, wherein the multipolar coding is bipolar.

13. A grating according to claim 11, wherein the multipolar coding is quadrupolar.

14. A grating according to claim 12, wherein the photosensitive optical waveguide is an optical fiber.

15. An optical switching node for switching a packet comprising a header and a data payload, the optical switching node comprising:
    a splitter;
    a switch;
    one or more gratings according to claim 10 for decoding optical signals;
    at least one output line;
    wherein the splitter is connected to the switch and to the one or more gratings and is operable to split the packet between the switch and the one or more gratings; and
    the one or more gratings are arranged to receive the header and to cause the switch to route the data payload to the at least one output line when the header matches one of the one or more gratings.

16. An optical switching node according to claim 15, wherein the switch comprises an optical switch.

17. An optical switching node according to claim 16, and further comprising an optoelectronic converter arranged between the optical switch and the one or more gratings.

18. An optical switching node according to claim 17, and further comprising an electronic decision circuit connected to the optoelectronic converter, the electric decision circuit configured to trigger the optical switch.

19. An optical switching node according to claim 18, and further comprising a delay line arranged between the splitter and the optical switch.

20. An optical switching node according to claim 19, wherein the delay line is actively controlled.

21. An optical switching node according to claim 15, wherein the switch is selected from the group comprising: a router; a filter; and a modulator.

* * * * *